(12) United States Patent
Mori

(10) Patent No.: US 9,222,449 B2
(45) Date of Patent: Dec. 29, 2015

(54) SPARK IGNITION TYPE INTERNAL COMBUSTION ENGINE

(75) Inventor: Sachio Mori, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 712 days.

(21) Appl. No.: 13/387,826

(22) PCT Filed: Aug. 7, 2009

(86) PCT No.: PCT/JP2009/064043
§ 371 (c)(1),
(2), (4) Date: Jan. 30, 2012

(87) PCT Pub. No.: WO2011/016136
PCT Pub. Date: Feb. 10, 2011

(65) Prior Publication Data
US 2012/0125289 A1  May 24, 2012

(51) Int. Cl.
*F02B 17/00* (2006.01)
*F02B 15/00* (2006.01)
(Continued)

(52) U.S. Cl.
CPC ..... *F02M 35/10177* (2013.01); *F02D 13/0207* (2013.01); *F02D 13/0257* (2013.01);
(Continued)

(58) Field of Classification Search
CPC ............... F02B 17/00; F02B 2023/102; F02B 2023/085; F02B 2053/005; F02B 2075/125; F02B 1/04; F02M 69/00; F02M 35/10177; F02M 25/0723; F02M 35/1085; Y02T 10/44; F02D 41/3094; F02D 13/0223; F02D 13/0226; F02D 13/0261; F02D 41/365; F02D 13/0257; F02D 13/0207; F02P 15/08

USPC .......... 701/103–105, 108–110; 123/430, 431, 123/432, 219, 295, 299, 300, 302, 308, 436, 123/568.11, 568.13, 568.14, 90.15, 636, 123/638, 304
See application file for complete search history.

(56) References Cited

U.S. PATENT DOCUMENTS 4,270,500 A * 6/1981 Nakagawa ................ F01L 3/06
  123/308
4,548,175 A * 10/1985 Kawai ....................... F01L 1/26
  123/188.14

(Continued)

FOREIGN PATENT DOCUMENTS

JP  A-05-141302      6/1993
JP  H05141302 A  *  6/1993  .......... F02D 41/3094

(Continued)

OTHER PUBLICATIONS

Sep. 8, 2009 International Search Report issued in International Application No. PCT/JP2009/064043 (with translation).

*Primary Examiner* — Stephen K Cronin
*Assistant Examiner* — Brian Kirby
(74) *Attorney, Agent, or Firm* — Oliff PLC

(57) ABSTRACT

An internal combustion engine can form, in a combustion chamber, a fuel-air mixture region located on the first intake port side and containing mainly a fuel-air mixture, and a burned gas region located on the second intake port side and containing burned gas. When the fuel-air mixture region and a burned gas region are formed, the internal combustion engine determines injection rates of a first fuel injection valve and a second fuel injection valve so that fuel is injected from the first fuel injection valve and second fuel injection valve respectively, depending on an EGR rate. The injection rates are determined such that the injection rate of the first fuel injection valve is increased in accordance with the rise of the EGR rate.

18 Claims, 23 Drawing Sheets

(51) Int. Cl.
*F02M 35/10* (2006.01)
*F02D 13/02* (2006.01)
*F02D 41/30* (2006.01)
*F02D 41/36* (2006.01)
*F02M 25/07* (2006.01)
*F02M 35/108* (2006.01)
*F02P 15/08* (2006.01)
*F02B 23/08* (2006.01)

(52) U.S. Cl.
CPC ........ *F02D13/0261* (2013.01); *F02D 41/3094* (2013.01); *F02D 41/365* (2013.01); *F02M 25/0723* (2013.01); *F02M 35/1085* (2013.01); *F02P 15/08* (2013.01); *F02B 2023/085* (2013.01); *Y02T 10/18* (2013.01)

(56) References Cited

U.S. PATENT DOCUMENTS

| | | | | |
|---|---|---|---|---|
| 4,732,116 A * | 3/1988 | Tanahashi | ............. | F02B 25/145 123/184.54 |
| 5,002,031 A * | 3/1991 | Kako | ................. | F02D 41/0065 123/478 |
| 5,050,557 A * | 9/1991 | Ishida | ..................... | F02B 17/00 123/308 |
| 5,209,201 A * | 5/1993 | Horie | ..................... | F01L 1/267 123/308 |
| 5,237,973 A * | 8/1993 | Oda | ......................... | F02B 23/08 123/432 |
| 5,482,020 A * | 1/1996 | Shimizu | ............. | F02D 41/0072 123/406.47 |
| 5,505,174 A * | 4/1996 | Komoriya | ........... | F02D 41/0072 123/406.48 |
| 5,967,114 A * | 10/1999 | Yasuoka | ................ | F01L 1/344 123/295 |
| 6,085,733 A * | 7/2000 | Motoyama | ............. | F02P 9/007 123/636 |
| 6,176,220 B1 * | 1/2001 | Mashiki | ................. | F02D 35/023 123/295 |
| 6,244,246 B1 * | 6/2001 | Hei Ma | ................ | F02B 17/005 123/302 |
| 6,543,230 B1 * | 4/2003 | Schmid | ............. | F02M 25/0707 123/568.11 |
| 6,637,386 B2 * | 10/2003 | Murata | ..................... | F01L 1/34 123/90.15 |
| 6,681,744 B2 * | 1/2004 | Itoyama | ............. | F02D 41/0072 123/480 |
| 6,722,344 B2 * | 4/2004 | Ashida | .................... | F02B 17/00 123/308 |
| 6,742,495 B2 * | 6/2004 | Ashida | .................... | F02B 31/04 123/310 |
| 6,817,349 B2 * | 11/2004 | Awasaka | ................ | F02B 33/32 123/564 |
| 6,895,933 B2 * | 5/2005 | Miwa | ...................... | F02P 3/053 123/406.47 |
| 6,932,063 B1 * | 8/2005 | Hu | ...................... | F02D 13/0223 123/568.14 |
| 7,093,590 B2 * | 8/2006 | Shimazaki | ............ | F02D 41/006 123/568.14 |
| 7,448,359 B2 * | 11/2008 | Jankovic | ............ | F02D 13/0234 123/302 |
| 7,654,244 B2 * | 2/2010 | Linderyd | ................ | F02B 17/00 123/295 |
| 7,802,556 B2 * | 9/2010 | Ohtsubo | ................... | F02B 1/14 123/406.47 |
| RE42,056 E * | 1/2011 | Akazaki et al. | ................. | 60/278 |
| 7,942,129 B2 * | 5/2011 | Pagot | ........................ | F02B 1/04 123/432 |
| 8,281,766 B2 * | 10/2012 | Tomiita | ............ | F02M 35/10177 123/432 |
| 2006/0011180 A1 * | 1/2006 | Sasaki | .................... | F01N 3/0814 123/698 |
| 2006/0037582 A1 * | 2/2006 | Adachi | ................ | F02D 41/1481 123/305 |
| 2006/0272623 A1 * | 12/2006 | Pagot | ........................ | F01L 1/26 123/559.1 |
| 2007/0119412 A1 * | 5/2007 | Leone | ................ | F02D 41/0025 123/295 |
| 2007/0215110 A1 * | 9/2007 | Stein | ................... | F02D 19/0628 123/431 |
| 2008/0135027 A1 * | 6/2008 | Pagot | ...................... | F02B 25/22 123/568.11 |
| 2009/0198434 A1 * | 8/2009 | Tanaka | ................ | F02D 41/1495 701/103 |

FOREIGN PATENT DOCUMENTS

| | | |
|---|---|---|
| JP | A-05-288095 | 11/1993 |
| JP | A-07-310603 | 11/1995 |
| JP | A-2001-342877 | 12/2001 |
| JP | A-2006-009660 | 1/2006 |
| JP | A-2007-023971 | 2/2007 |
| JP | A-2008-255866 | 10/2008 |

* cited by examiner

SPARK IGNITION TYPE INTERNAL COMBUSTION ENGINE

TECHNICAL FIELD

The present invention relates to a spark ignition type internal combustion engine which spark ignites an air-fuel mixture within a combustion chamber.

BACKGROUND ART

There has been known a spark ignition type internal combustion engine which is structured such that a fuel injection valve is provided one by one in each of two intake ports of the same cylinder, and a part of exhaust gas corresponding to burned gas is introduced as EGR gas only to one of these two intake ports (Patent Literature 1). In addition, as a prior art document which relates to the present invention, Patent Literatures 2 to 4 exist.

CITATION LIST

Patent Literature

Patent Literature 1: Japanese Patent Application Laid-Open No. 2008-255866
Patent Literature 2: Japanese Patent Application Laid-Open No. 2006-9660
Patent Literature 3: Japanese Patent Application Laid-Open No. H05-288095
Patent Literature 4: Japanese Patent Application Laid-Open No. 2007-23971

SUMMARY OF INVENTION

Technical Problem

In the internal combustion engine of the Patent Literature 1, since the EGR gas is introduced to the only one intake port, a burned gas region in which the EGR gas is mainly contained is formed within the combustion chamber correspondingly to the intake port to which the EGR gas is introduced, and an air-fuel mixture region in which the air-fuel mixture is mainly contained and is formed within the combustion chamber correspondingly to the other intake port. Since these regions are stratified within the combustion chamber, it is possible to avoid a mixture of the EGR gas and the air-fuel mixture to the maximum. Thereby, since it is possible to suppress a combustion deterioration which goes with the introduction of the EGR gas, it is possible to enlarge an introduction limit amount of the EGR gas, then it is possible to improve a fuel consumption.

However, the internal combustion engine of the Patent Literature 1 injects the fuel from each of the fuel injection valves at the moment of introducing the EGR gas, and on the other hand, injects the fuel only from the fuel injection valve which is provided in the intake port in a side to which the EGR gas is not introduced, at the moment of interrupting the introduction of the EGR gas. Accordingly, the fuel which is necessary for setting a target air fuel ratio exists disproportionately in the air-fuel mixture region at the moment of introducing the EGR gas, and there is a risk that the air-fuel mixture region becomes locally rich. If the locally rich region is generated within the combustion chamber, an oxygen deficiency is generated in the region. Therefore, there is such a problem that a discharge amount of a carbon monoxide, an unburned carbon hydride or the like is increased.

Accordingly, an object of the present invention is to provide a spark ignition type internal combustion engine which can inhibit an air-fuel mixture region from becoming locally rich, in the case that the air-fuel mixture region and a burned gas region are stratified within a combustion chamber.

Solution to Problem

A spark ignition type internal combustion engine of the present invention comprises: a first intake port and a second intake port which are open to a combustion chamber; an ignition device which feeds a spark to the combustion chamber; a first fuel injection valve which is provided in the first intake port; a second fuel injection valve which is provided in the second intake port; a stratifying device which forms within the combustion chamber, an air-fuel mixture region positioned in a side of the first intake port and mainly containing air-fuel mixture, and a burned gas region positioned in a side of the second intake port and containing burned gas; an injection amount calculating device which calculates a total of fuel injection amount to be injected by each of the first fuel injection valve and the second fuel injection valve in such a manner that a combustion is realized at a target air fuel ratio; an injection rate determining device which determines an injection rate of the fuel to be injected by each of the first fuel injection valve and the second fuel injection valve with respect to the total; and an injection control device which controls each of the first fuel injection valve and the second fuel injection valve on the basis of a result of calculation of the injection amount calculating device and a result of determination of the injection rate determining device, wherein the injection rate determining device determines the injection rate of each of the first fuel injection valve and the second fuel injection valve, so that, in a case that the air-fuel mixture region and the burned gas region are formed within the combustion chamber, the fuel is injected from each of the first fuel injection valve and the second fuel injection valve depending on an EGR rate corresponding to a rate of the burned gas included in the gas which is filled in the combustion chamber.

According to the internal combustion engine, in the case that the air-fuel mixture region and the burned gas region are formed within the combustion chamber by the stratifying device, the fuel is injected from each of the first fuel injection valve and the second fuel injection valve depending on the EGR rate. Thereby, since the fuel is fed not only to the air-fuel mixture region but also to the burned gas region, the disproportional distribution of the fuel to the air-fuel mixture region is reduced. Accordingly, since it is possible to prohibit the air-fuel mixture region from becoming locally rich, it is possible to reduce the discharge amount of the carbon monoxide, the unburned carbon hydride and the like in comparison with the case that the fuel is fed only to the air-fuel mixture region.

In one aspect of the internal combustion engine of the present invention, the injection rate determining device may determine the injection rate of each of the first fuel injection valve and the second fuel injection valve so that the injection rate of the first fuel injection valve is enhanced in accordance with a rise of the EGR rate. There is established such a relationship that if one is defined, another is defined, with respect to the injection rates of the first fuel injection valve and the second fuel injection valve. Accordingly, if the injection rate of the first fuel injection valve is enhanced in accordance with the rise of the EGR rate, in connection with this, the injection rate of the second fuel injection valve is lowered. In other words, in the case that the air-fuel mixture region and the burned gas region are formed, the injection rate of the second fuel injection valve is lowered in accordance with the rise of the EGR rate. Therefore, an amount of the fuel fed to the burned gas region is lowered in connection with the reduction of a concentration of the oxygen in the burned gas region in accordance with the rise of the EGR rate. Thereby, it is possible to reduce the disproportional distribution of the fuel to the air-fuel mixture region while preventing the fuel feed to the burned gas region from becoming excessive. It is possible to appropriately define how much the injection rate of each of the fuel injection valves is changed in accordance with the change of the EGR rate. For example, it is possible to optimize the injection rate of each of the fuel injection valves in accordance with the EGR rate, by correlating the EGR rate with the injection rate of each of the fuel injection valves in such a manner that the discharge amount of the carbon monoxide, the unburned carbon hydride and the like becomes minimum. The optimization mentioned above can be realized by utilizing a well-known method such as an actual machine test, a simulation or the like.

In one aspect of the internal combustion engine of the present invention, wherein an external EGR device which introduces a part of the burned gas taken out of an exhaust passage to the second intake port in a limited manner may be provided as the stratifying device. In the case of utilizing the external EGR device, the following preferable first to fifth aspects may be included.

As a first aspect, the spark ignition type internal combustion engine may comprise: an oxygen concentration sensor which detects an air fuel ratio of the burned gas within the exhaust passage; an EGR control device which selectively carries out an EGR execution mode where executed is the introduction of the burned gas to the second intake port by the external EGR device and an EGR prohibition mode where prohibited is the introduction, and a characteristic acquiring device which makes only the first fuel injection valve inject the fuel on the basis of a result of detection of the oxygen concentration sensor in such a manner that the combustion in accordance with the target air fuel ratio is realized at a moment of carrying out the EGR prohibition mode, and specifies a correlation between the fuel injection amount and an intake air amount or an intake pressure of the first fuel injection valve at a moment when the combustion in accordance with the target air fuel ratio is realized, wherein the injection control device may change, at a moment of carrying out the EGR execution mode, the injection amount of the second fuel injection valve on the basis of the result of detection of the oxygen concentration sensor so that the combustion in accordance with the target air fuel ratio is realized, while determining the fuel injection amount of the first fuel injection valve on the basis of the correlation which is specified by the characteristic acquiring device.

In general, with respect to the fuel injection valve, since an injection characteristic such as an injection rate or the like changes in accordance with a duration of service, a displacement is generated between a command value of the fuel injection amount (the injection period) given to the fuel injection valve and a fuel injection amount actually injected. It is hard to directly know the fuel injection amount which is actually injected from the fuel injection valve, and it is only possible to indirectly make certain of the fuel injection amount from the air fuel ratio within the exhaust passage as the matter stands. In such an actual condition, it is possible to comprehend a total of the fuel injection amount which was injected from each of the fuel injection valves, however, it is impossible to individually comprehend the fuel injection amount which each of the fuel injection valves actually injected. Accordingly, when a divisional injection is carried out by the first fuel injection valve and the second fuel injection valve, it is impossible to individually apply a feedback control to each of the fuel injection valves.

According to this aspect, the correlation between the fuel injection amount and the intake air amount or the intake pressure of the first fuel injection valve at a moment when the target air fuel ratio is realized is specified at a moment of carrying out the EGR prohibition mode, the fuel injection amount of the first fuel injection valve is determined by utilizing the correlation at a moment of the EGR execution mode, and the fuel injection amount of the second fuel injection valve is changed on the basis of the result of detection of the oxygen concentration sensor so that the target air fuel ratio is realized. Since the control mentioned above is carried out, it is possible to prevent the displacement of the target air fuel ratio caused by an aged deterioration of the injection characteristic of each of the fuel injection valves only by utilizing the single oxygen concentration sensor, even if the fuel injection amounts which are actually injected respectively from the first fuel injection valve and the second fuel injection valve can not be simultaneously comprehended.

As a second aspect, the injection control device may control the second fuel injection valve in such a manner that the fuel injection timing by the second fuel injection valve changes depending on a load. According to this aspect, since the fuel injection timing of the second fuel injection valve changes depending on the load, it is possible to stratify the air-fuel mixture region and the burned gas region within the combustion chamber in a wide operation region.

Specifically, the spark ignition type internal combustion engine may further comprises a first intake valve which opens and closes the first intake port and a second intake valve which opens and closes the second intake port, wherein the injection control device may control the second fuel injection valve in such a manner that the fuel is injected by the second fuel injection valve in a first half of an intake stroke in which each of the first intake valve and the second intake valve opens, at a moment when the load is equal to or more than a predetermined value. Since the combustion of the burned gas region is delayed in comparison with the air-fuel mixture region, a knocking tends to be generated in the burned gas region in comparison with the air-fuel mixture region, at a moment when the load is equal to or more than the predetermined value. Accordingly, since the fuel is vaporized in the burned gas region and the burned gas region is cooled, by injecting the fuel from the second fuel injection valve in the first half of the intake stroke, it is possible to suppress the generation of the knocking in the burned gas region. Thereby, since it is unnecessary to increase the amount of the fuel for suppressing the knocking, it is possible to improve a fuel consumption.

If the first intake valve and the second intake valve are operated in accordance with the same valve opening characteristic at a moment when the burned gas region is cooled, there is generated such a flow rate difference that an intake amount from the second intake port is more than an intake amount from the first intake port. If this flow rate difference is generated, a boundary between the air-fuel mixture region and the burned gas region tends to be collapsed, and there is a possibility that a stratifying level of these regions is lowered. Accordingly, the spark ignition type internal combustion engine may further comprise a valve moving device which differentiates a gas amount to be fed to the combustion chamber via the first intake port and a gas amount to be fed to the combustion chamber via the second intake port, by operating each of the first intake valve and the second intake valve, wherein the valve moving device may operate each of the first intake valve and the second intake valve, in such a manner that the gas amount via the first intake port becomes more than the gas amount via the second intake port, in a case that the fuel is injected by the second fuel injection valve in the first half of the intake stroke. Thereby, since each of the intake valves is operated to cancel the flow rate difference which can be generated in the case that the burned gas region is cooled, the flow rate difference is corrected and the reduction of the stratifying level can be suppressed. Therefore, it is possible to prevent the generation of the knocking while maintaining the stratifying level.

Further, the spark ignition type internal combustion engine may further comprising a first intake valve which opens and closes the first intake port, and a second intake valve which opens and closes the second intake port, wherein the injection control device may control the second fuel injection valve in such a manner that the fuel is injected by the second fuel injection valve before the second intake valve is opened, at a moment when the load is equal to or less than a predetermined value. Since the combustion of the burned gas region is delayed in comparison with the air-fuel mixture region, an unburned carbon hydride tends to be generated in the burned gas region at a moment when the load is equal to or less than the predetermined value. Accordingly, since the fuel receives the heat from a wall surface of the second intake port so as to be vaporized by making the second fuel injection valve inject the fuel before the second intake valve is opened, the gas in a high temperature state is taken into the combustion chamber. Thereby, since the burned gas region can be easily maintained at a high temperature, it is possible to reduce a generation amount of the unburned carbon hydride.

Further, the spark ignition type internal combustion engine may further comprise a first intake valve which opens and closes the first intake port, and a second intake valve which opens and closes the second intake port, wherein the injection control device may control the first fuel injection valve and the second fuel injection valve in such a manner that the fuel is injected by each of the first fuel injection valve and the second fuel injection valve during an intake stroke in which each of the first intake valve and the second intake valve is opened, at a moment of a full load. In this case, since the fuel is injected from each of the fuel injection valves during the intake stroke, the fuel is vaporized and it is possible to lower a temperature within the combustion chamber. Thereby, it is possible to obtain both of the suppression of the knocking and the improvement of a filling efficiency.

Further, the spark ignition type internal combustion engine may further comprise a first intake valve which opens and closes the first intake port, and a second intake valve which opens and closes the second intake port, wherein an ignition plug arranged in a center of the combustion chamber may be provided as the ignition device, and the injection control device may control the second fuel injection valve in such a manner that the fuel is injected by the second fuel injection valve in a second half of valve opening period of the second intake valve, at a moment of an idle operation. In this case, also after the second intake valve is closed the vaporization of the fuel is promoted in the burned gas region. Thereby, since the temperature of the burned gas region decreases, the burned gas region contracts. The boundary between the air-fuel mixture region and the burned gas region shifts from the center of the combustion chamber to a burned gas region side. Due to this, the ignition plug arranged in the center of the combustion chamber is included in the air-fuel mixture region where the concentration of the burned gas is low at even a moment of the idle operation in which the ignition characteristic is bad. Accordingly, it is possible to improve the ignition characteristics at the moment of the idle operation in which the ignition characteristic tends to lower because of the ignition plug arranged in the center of the combustion chamber.

As a third aspect, the spark ignition type internal combustion engine may comprise: as the ignition device, a first ignition plug which is arranged in the combustion chamber in such a manner as to be biased to a side of the first intake port and a second ignition plug which is arranged in the combustion chamber in such a manner as to be biased to a side of the second intake port; and an ignition control device which controls the first ignition plug and the second ignition plug in such a manner that the ignition by the second ignition plug is carried out earlier than the ignition by the first ignition plug, at a moment when a load is equal to or more than a predetermined value. The ignition characteristic is worse in the burned gas region in comparison with in the air-fuel mixture region, so that the combustion is delayed. Accordingly, it is possible to start the combustion of the burned gas region earlier than the combustion of the air-fuel mixture region, by carrying out the ignition by the second ignition plug earlier than the ignition by the first ignition plug, at a moment when the load is equal to or more than the predetermined value. As a result, since it is possible to sufficiently secure a combustion period of the burned gas region in which the unburned carbon hydride tends to be generated, it is possible to reduce the discharge of the unburned carbon hydride.

As a fourth aspect, the spark ignition type internal combustion engine may comprise: as the ignition device, a first ignition plug which is arranged in the combustion chamber in such a manner as to be biased to a side of the first intake port and a second ignition plug which is arranged in the combustion chamber in such a manner as to be biased to a side of the second intake port; and an ignition control device which controls the first ignition plug and the second ignition plug in such a manner that the ignition by the second ignition plug is carried out later than the ignition by the first ignition plug, at a moment when a load is equal to or less than a predetermined value. In the case that the load is equal to or less than the predetermined value, and the temperature within the combustion chamber is low, there is such a possibility that an accidental fire is generated in the burned gas region. According to this aspect, it is possible to enhance the pressure and the temperature of the burned gas region by utilizing a flame propagation which is formed by the preceding combustion of the air-fuel mixture region, and it is possible to ignite by the second ignition plug in a state in which the pressure and the temperature are enhanced. Thereby, it is possible to improve an ignition characteristic of the burned gas region.

As a fifth aspect, the spark ignition type internal combustion engine may comprise: as the ignition device, a first ignition plug which is arranged in the combustion chamber in such a manner as to be biased to a side of the first intake port and a second ignition plug which is arranged in the combustion chamber in such a manner as to be biased to a side of the second intake port; and an ignition control device which controls the first ignition plug and the second ignition plug in such a manner that the ignition by the second ignition plug is carried out later than the ignition by the first ignition plug, and the ignition by the second ignition plug is carried out more than once, at a moment when a rotation number is equal to or less than a predetermined value and a load is equal to or less than a predetermined value. According to this aspect, since a flame propagation speed of the burned gas region is lower than a flame propagation speed of the air-fuel mixture region due to a high burned gas concentration, it is possible to move the unburned air-fuel mixture to the side of the burned gas region by utilizing the flame propagation which is formed by the combustion of the air-fuel mixture region. Since it is possible to ignite sequentially the unburned air-fuel mixture which comes to the side of the burned gas region caused by the combustion of the air-fuel mixture region in accordance with the plural times of ignitions of the second ignition plug. Accordingly, it is possible to accelerate the burning speed. Thereby, it is possible to suppress the generation of the knocking.

In one aspect of the internal combustion engine of the present invention, the spark ignition type internal combustion engine may further comprise: a first intake valve which opens and closes the first intake port, and a second intake valve which opens and closes the second intake port, wherein as the ignition device, an ignition plug may be provided, the ignition plug being arranged in the combustion chamber in such a manner as to be biased to a side of the first intake port, and as the stratifying device, an internal EGR device may be provided, the internal EGR device forming the air-fuel mixture region and the burned gas region within the combustion chamber by opening only the second intake valve in a second half of an exhaust stroke so as to lead the burned gas within the combustion chamber into the second intake port. According to this aspect, since it is possible to securely carry out the ignition in the air-fuel mixture region by the ignition plug, and it is possible to promote a self-ignition by utilizing the high temperature burned gas which is contained in the burned gas region in the second half of the combustion. Because of this, it is possible to suppress the discharge of the unburned carbon hydride. In the case that the internal EGR device is utilized as the stratifying device as mentioned above, the following preferable first to fourth aspects may be included.

As a first aspect, the internal EGR device may alternately switch states within the combustion chamber between a stratified state in which the air-fuel mixture region and the burned gas region are formed within the combustion chamber by opening only the second intake valve in the second half of the exhaust stroke so as to lead the burned gas within the combustion chamber into the second intake port, and an unstratified state in which the formation of the air-fuel mixture region and the burned gas region within the combustion chamber is limited by operating each of the first intake valve and the second intake valve, and the injection rate determining device may determine the injection rate of each of the first fuel injection valve and the second fuel injection valve in such a manner that the stratified state and the unstratified state are different from each other in the injection rate of each of the first fuel injection valve and the second fuel injection valve. According to this aspect, it is possible to raise the combustion temperature with respect to the combustion under the unstratified state. The high temperature burned gas obtained thereby can be included in the burned gas region in the stratified state in the next cycle. Accordingly, even in the case that the load is low and the temperature required for the self-ignition in the burned gas region can not be obtained, by alternately repeating the stratified state and the unstratified state, it is possible to promote the self-ignition of the burned gas region by utilizing in the next cycle, the high temperature burned gas obtained in the unstratified state of the preceding cycle. Thereby, it is possible to reduce the discharge of the unburned carbon hydride.

As a second aspect, the injection control device may control the second fuel injection valve in such a manner that the fuel is injected by the second fuel injection valve in the second half of the intake stroke in which each of the first intake valve and the second intake valve is opened, at a moment when a load is equal to or more than a predetermined value. According to this aspect, it is possible to lower the temperature of the burned gas region by means of a latent heat of vaporization of the fuel which is injected in the second half of the intake stroke. Thereby, since it is possible to make the self-ignition slow at a moment when the load is equal to or more than the predetermined value, it is possible to suppress a noise.

As a third aspect, the injection control device may control the second fuel injection valve in such a manner that the fuel is injected by the second fuel injection valve after the second intake valve is opened and before the first intake valve is opened, at a moment when a load is equal to or less than a predetermined value. In the period after the second intake valve is opened and before the first intake valve is opened, there is such a condition that the temperature of the burned gas is comparatively high. By injecting the fuel from the second fuel injection valve under this condition, the fuel is exposed to the high temperature burned gas so as to be reformed to have an easily burning nature. Thereby, it is possible to obtain a stable self-ignition in the burned gas region.

As a fourth aspect, the internal EGR device may lead the burned gas within the combustion chamber to the second intake port by making smaller, in a case that a load is high, a lift amount at a moment of opening only the second intake valve in the second half of the exhaust stroke, in comparison with the lift amount in a case that the load is low. The temperature of the burned gas of a moment when the load is high is higher in comparison with the temperature of a moment when the load is low. Because of this, under the condition that the load is high, since the self-ignition is easily generated, the noise could be a problem. According to this aspect, since the second intake port is narrowed down in the case that the load is high in comparison with the case that the load is low, a flow rate of the burned gas which flows back in the second intake port becomes higher than the flow rate in the case that the load is low. Because of this, since a heat transmission to the second intake port is promoted, it is possible to lower the temperature of the burned gas. Thereby, since the self-ignition in the burned gas region becomes slow, it is possible to suppress the noise.

DESCRIPTION OF EMBODIMENTS

First Embodiment

Figure 1:
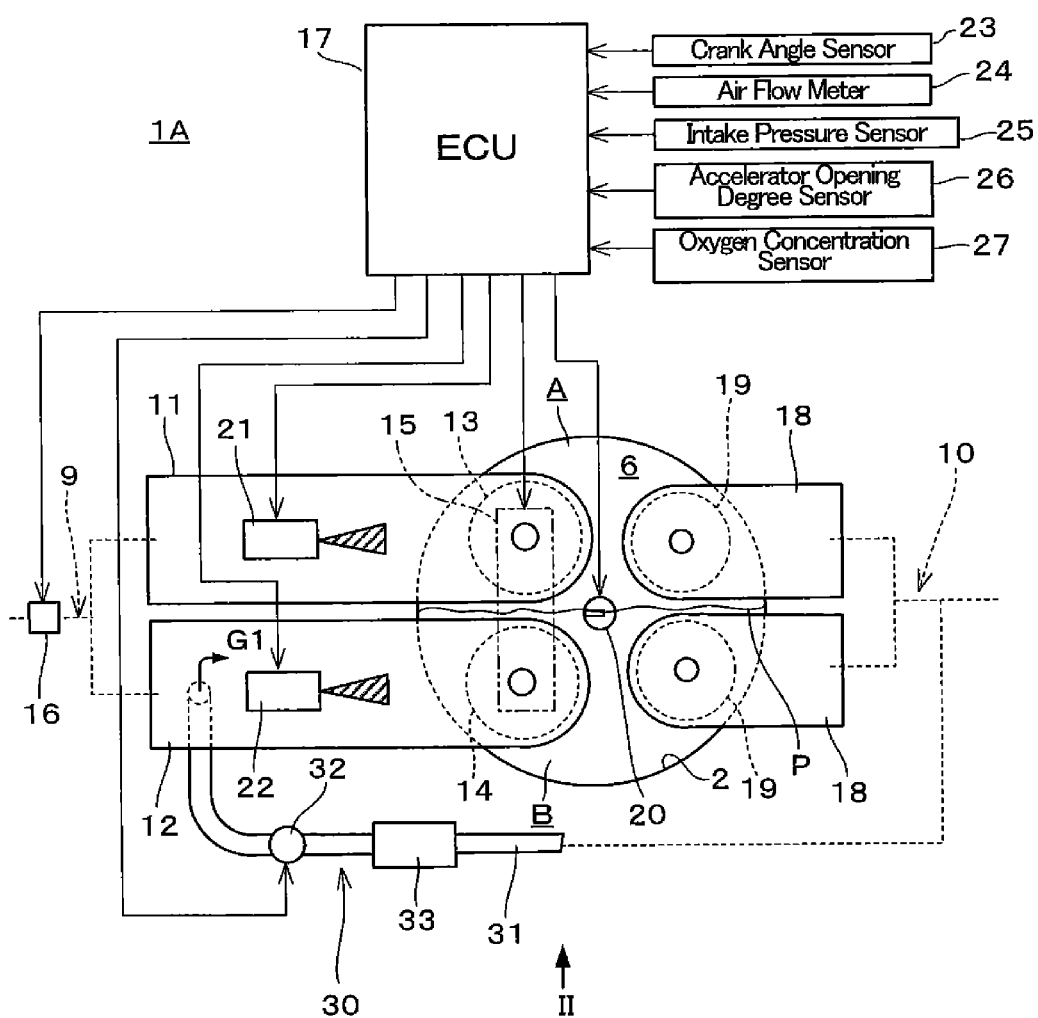
FIG. 1 is a top view schematically showing a substantial part of a spark ignition type internal combustion engine in accordance with an embodiment of the present invention.
Figure 2:
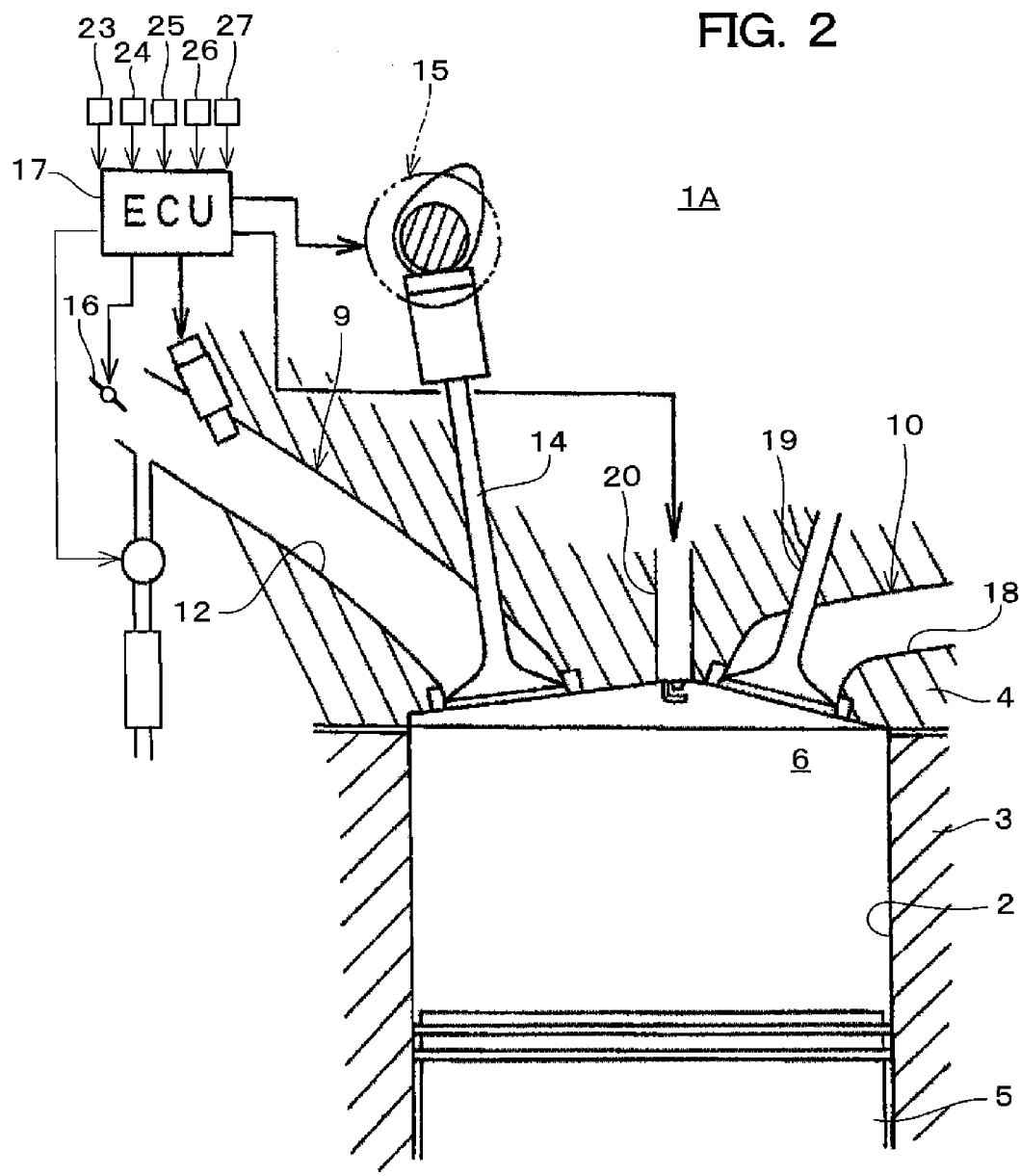
FIG. 2 is a schematic view showing the internal combustion engine in FIG. 1 viewed from a direction of an arrow II.

FIG. 1 is a top view schematically showing a substantial part of a spark ignition type internal combustion engine in accordance with a first embodiment of the present invention, and FIG. 2 is a cross sectional schematic view showing the internal combustion engine in FIG. 1 viewed from a front face. An internal combustion engine 1A is constructed as a spark ignition type four-cycle internal combustion engine which can be mounted as a traveling power source to a vehicle which is not illustrated. The internal combustion engine 1A is provided with a plurality of cylinders 2 (one cylinder is shown in the drawing). The cylinder 2 is formed in a cylinder block 3, and an upper portion of the cylinder 2 is occluded by a cylinder head 4. A piston 5 is provided in the cylinder 2 so as to freely reciprocate. A combustion chamber 6 of the internal combustion engine 1A is formed as a space which is surrounded by an inner peripheral surface of the cylinder 2, a ceiling surface of the cylinder 2 and a top surface of the piston 5.

Each of an intake passage 9 and an exhaust passage 10 is connected to the cylinder 2. The intake passage 9 includes a first intake port 11 and a second intake port 12 which are formed in the cylinder head 4 in such a manner as to be open to the combustion chamber 6. The cylinder head 4 is provided with a first intake valve 13 which opens and closes the first intake port 11 and a second intake valve 14 which opens and closes the second intake port 12. Each of the intake valves 13 and 14 is driven so as to be opened and closed by a valve moving mechanism 15 which serves as a valve moving device, and the valve moving mechanism 15 can independently change a valve opening characteristic such as a valve lift amount, a valve timing or the like of each of the intake valves 13 and 14. Since the valve moving mechanism 15 may be structured such as to be the same as the well-known one, a description of a detailed structure will be omitted. The intake passage 9 is provided with a throttle valve 16 which regulates the air amount in an upstream side of each of the intake ports 11 and 12. Operations of each of the valve moving mechanism 15 and the throttle valve 16 are controlled by an engine control unit (ECU) 17 which is constructed as a computer controlling an operation state of the internal combustion engine 1A.

The exhaust passage 10 includes two exhaust ports 18 which are open to the top surface of the combustion chamber 6. Each of the exhaust ports 18 is opened and closed by an exhaust valve 19. The exhaust valve 19 is driven so as to be opened and closed by a valve moving mechanism which is not illustrated. Although an illustration is omitted, a three-way catalyst is provided in the exhaust passage 10, and the exhaust gas corresponding to burned gas flowing through the exhaust passage 10 is purified by the three-way catalyst.

The cylinder head 4 is provided with an ignition plug 20 which is arranged in the center of the combustion chamber 6 in such a manner that a leading end portion is faced to the ceiling surface of the combustion chamber 6. Further, to the cylinder head 4, there is attached each of a first fuel injection valve 21 which is provided in the first intake port 11, and a second fuel injection valve 22 which is provided in the second intake port 12. Motions of each of the ignition plug 20, the first fuel injection valve 21, and the second fuel injection valve 22 are controlled by the ECU 17 executing a predetermined control program while referring to signals from various sensors. As the sensors associated with the present invention, there are provided a crank angle sensor 23 which outputs a signal depending on the rotation number of engine (a rotating speed), an air flow meter 24 which outputs a signal depending on an intake air amount taken into the combustion chamber 6, an intake pressure sensor 25 which outputs a signal depending on the pressure within the intake passage 6, an accelerator opening degree sensor 26 which outputs a signal depending on an opening degree of an accelerator pedal which is not illustrated, and an oxygen concentration sensor 27 which outputs a signal depending on an air fuel ratio of the exhaust gas. The oxygen concentration sensor 27 is structured such as to output a rich signal which indicates that the air fuel ratio is in a rich side, and a lean signal which indicates that the air fuel ratio is in a lean side, centering on a theoretical air fuel ratio. As a matter of fact, as the oxygen concentration sensor 27, it is possible to employ a structure which outputs a signal linearly outputting to a change of a magnitude of the air fuel ratio.

As shown in FIG. 1 and FIG. 2, the internal combustion engine 1A is provided with an EGR device 30 which serves as an external EGR device for recirculating the exhaust gas flowing in the exhaust passage 10 to the intake system. The EGR device 30 is provided with an EGR passage 31 which connects the exhaust passage 10 and the second intake port 12, an EGR valve 32 which opens and closes the EGR passage 31, and an EGR cooler 33 which is provided in the EGR passage 31. The EGR passage 31 can introduce a part of the exhaust gas taken out of the exhaust passage 10 as external EGR gas to the second intake port 12 in a limited manner. In the case that a predetermined condition for recirculating the exhaust gas to the intake system is established, the EGR passage 31 is opened by the EGR valve 32 of the EGR device 30, and the external EGR gas G1 is introduced to the second intake port 12 in a limited manner. Thereby, while the air-fuel mixture being led to the combustion chamber 6 via the first intake port 11, the external EGR gas G1 is led via the second intake port 12 to the combustion chamber 6 together with the air-fuel mixture. Thereby, in the combustion chamber 6, an air-fuel mixture region A mainly containing the air-fuel mixture is formed in the side of the first intake port 11, and a burned gas region B containing the external EGR gas G1 corresponding to the burned gas is formed in the side of the second intake port 12, respectively. Since the EGR device 30 can stratify the air-fuel mixture region A and the burned gas region B within the combustion chamber 6 by introducing the external EGR gas G1 only to the second intake port 12, the EGR device 30 serves as a stratifying device in accordance with the present invention. A boundary P of each region A, B extends in such a manner as to intersect the center of the combustion chamber 6. In this case, although the boundary P can not be visually recognized as illustrated actually, the boundary P has a technical significance as a position at which a concentration distribution of the burned gas changes significantly.

Figure 3:
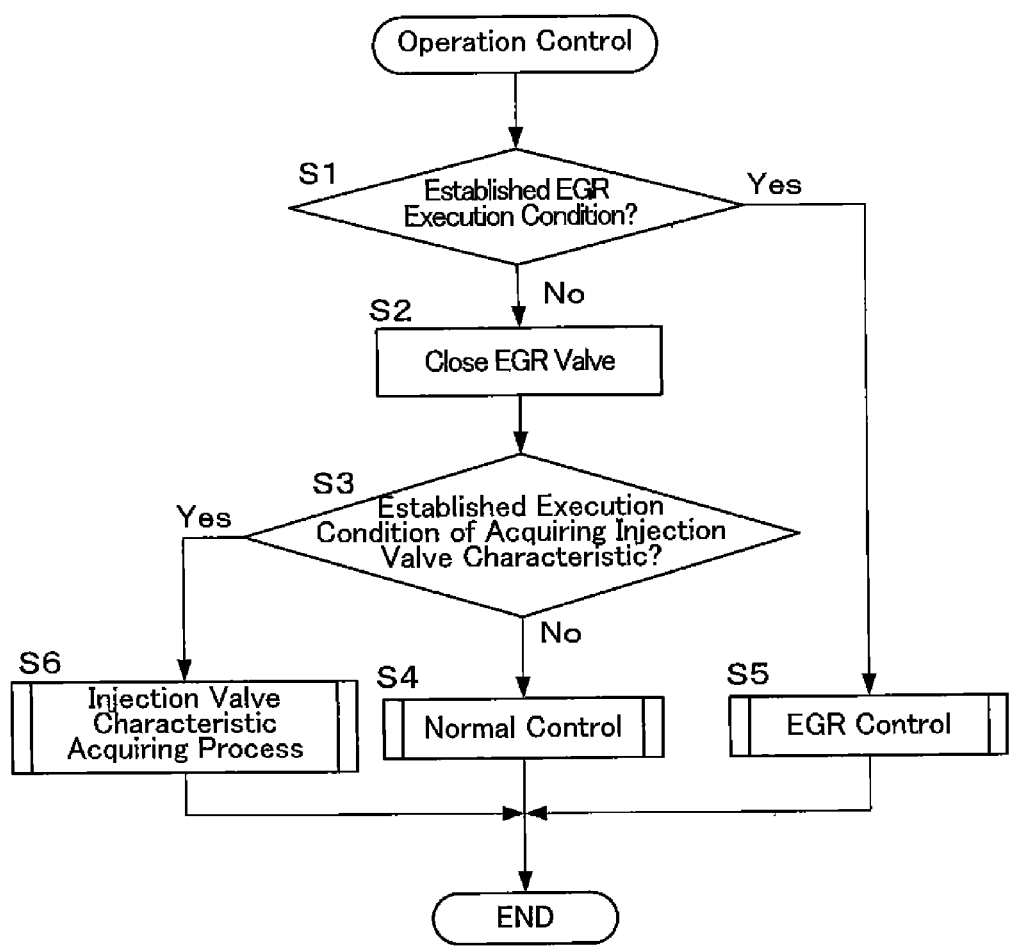
FIG. 3 is a flow chart showing an example of a control routine of an operation control which is carried out with respect to the internal combustion engine in FIG. 1.

Although there exist various controls carried out by the ECU 17, a description will be given here mainly about a control which is associated with the present invention. FIG. 3 is a flow chart showing an example of a control routine of an operation control which the ECU 17 executes. A program of this routine is retained in a memory device such as a ROM or the like which the ECU 17 has, and is fitly read so as to be executed repeatedly at a predetermined time interval.

First of all, in step S1, it is determined whether or not a condition for recirculating a part of the exhaust gas to the intake system (an EGR execution condition) is established. A well-known criterion is applied as a criterion for determining whether or not the execution of the exhaust gas recirculation is allowed. In the case that the EGR execution condition is established, the step goes to step S5, and executes an EGR control. In other words, the EGR execution mode is executed. On the other hand, in the case that the EGR execution condition is not established, the step goes to step S2 so as to close the EGR valve 32 of the EGR device 30 and interrupt an inflow of the exhaust gas to the intake system. Thereby, since the introduction of the exhaust gas to the intake system is prohibited, an EGR prohibition mode is executed.

In step S3, it is determined whether or not an execution condition of a process of comprehending an aged change of an injection characteristic of the first fuel injection valve 21 (an injection valve characteristic acquiring process) is established. A detail of this process will be mentioned later. The execution condition is defined on the basis of an operation time in such a manner that the injection valve characteristic acquiring process is carried out at a predetermined frequency. For example, it is possible to determine whether or not the execution condition is established, on the basis of whether or not an accumulated value of the operation time reaches a predetermined value. In the case that the execution condition is established, the step goes to step S6 so as to carry out the corresponding process, and in the case that the execution condition is not established, the step goes to step S4 so as to carry out a normal control. Thereafter, the routine in FIG. 3 is finished.

(Normal Control)

Figure 4:
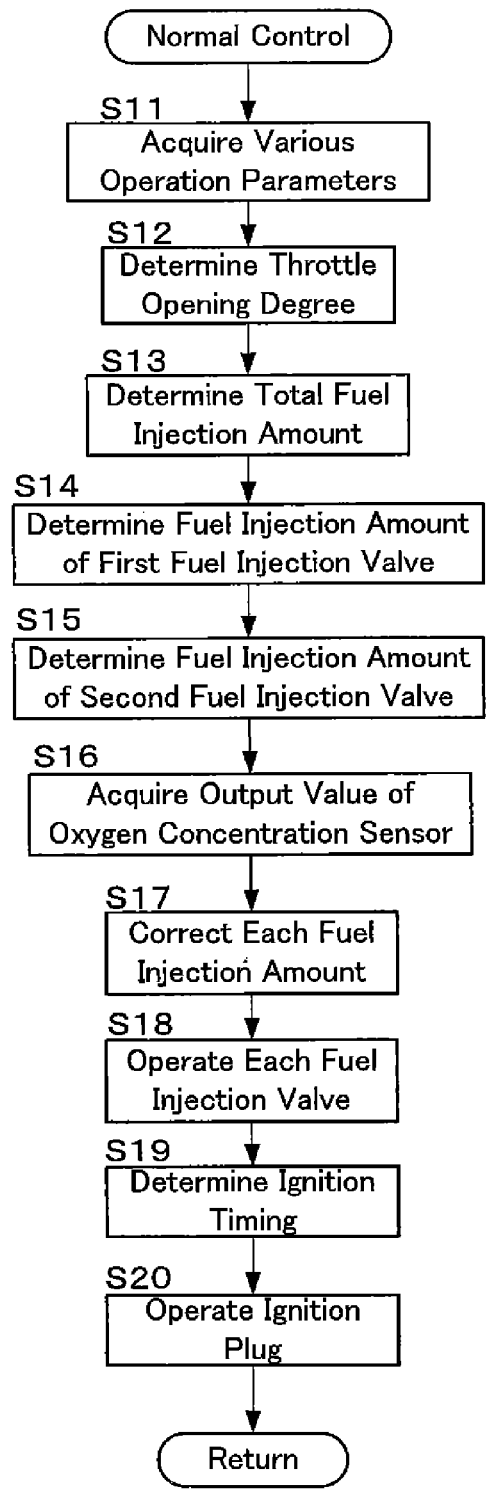
FIG. 4 is a flow chart showing an example of a routine of a normal control which is defined at step S4 in FIG. 3.

FIG. 4 shows an example of a routine of the normal control which is defined by step S4 in FIG. 3. In step S11, various operation parameters to be used for control are acquired. In these parameters, as typical ones, the rotation number of engine, the intake air amount, the intake pressure, the accelerator opening degree and the like are included. These operation parameters are acquired on the basis of output signals of the sensors 23 to 26 mentioned above respectively.

In step S12, the opening degree (a throttle opening degree) of the throttle valve 16 is determined on the basis of the accelerator opening degree, the rotation number of engine and the like which are acquired in step S11. In succeeding step S13, a total fuel injection amount is determined on the basis of the current intake air amount, so that the combustion is carried out in accordance with a target air fuel ratio, the total fuel injection amount corresponding to a total of the fuel injection amounts of the fuel injection valves 21 and 22. Since the determination method of the total fuel injection amount is the same as the well-known method, a description thereof will be omitted.

Since the normal control is an operation control under a state in which the burned gas does not exist in the intake system, an injection rate of each of the fuel injection valves 21 and 22 with respect to the total fuel injection amount is set to 50% in the present embodiment. Accordingly, in step S14, a fuel injection amount of the first fuel injection valve 21 is determined by multiplying the total fuel injection amount by the injection rate of the first fuel injection valve 21. On the other hand, in step S15, the fuel injection amount of the second fuel injection valve 22 is determined by multiplying the total fuel injection amount by the injection rate of the second fuel injection valve 22.

Next, in step 16, an output value of the oxygen concentration sensor 27 is acquired, and it is comprehended whether the air fuel ratio is richer or leaner than the theoretical air fuel ratio corresponding to the target air fuel ratio. In succeeding step S17, the fuel injection amounts of the fuel injection valves 21 and 22, which are determined in step S14 and step S15, are feedback-corrected respectively, to cancel a displacement from the target air fuel ratio comprehended in step S16. A correcting amount per one time in the present process can be appropriately determined.

In succeeding step S18, each of the fuel injection valves 21 and 22 is operated in such a manner that the fuel at the fuel injection amount corrected in step S17 is injected from each of the fuel injection valves 21 and 22. In detail, each of the fuel injection valves 21 and 22 is operated so as to be opened over an injection period corresponding to each of the fuel injection amounts. In the normal control, an injection timing of each of the fuel injection valves 21 and 22 is simultaneously set. In step S19, it is determined that an optimum ignition timing depending on the operation state of the internal combustion engine 1A. The determination method of this ignition timing is also the same as the well-known method. In succeeding step S20, the ignition plug 20 is operated so that the spark is generated from the ignition plug 20 at the ignition timing which is determined in step S19. Thereafter, the step goes back to the routine in FIG. 3 corresponding to the main routine.

(EGR Control)

Figure 5:
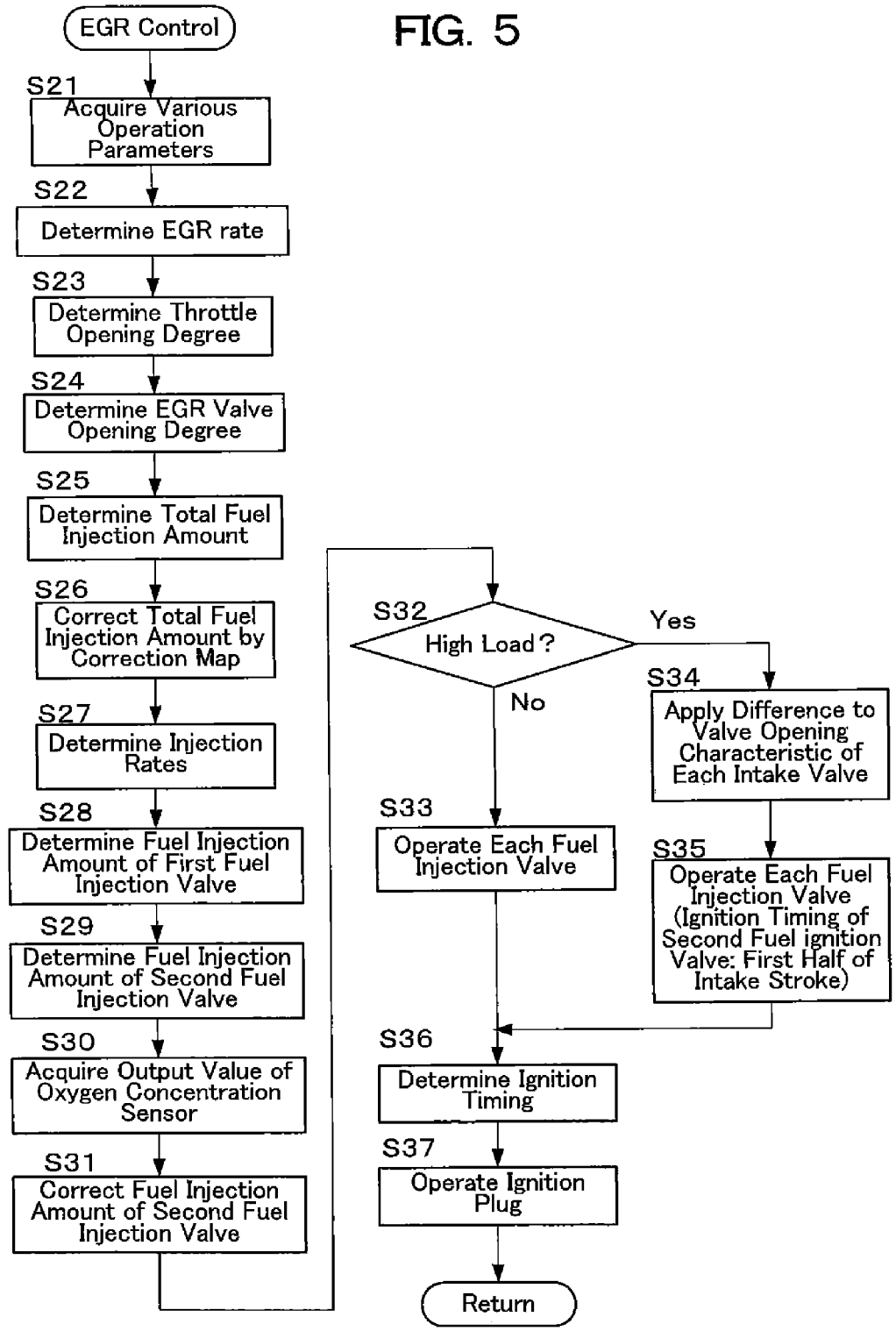
FIG. 5 is a flow chart showing an example of a routine of an EGR control which is defined at step S5 in FIG. 3.

FIG. 5 shows an example of the routine of the EGR control which is defined at step S5 in FIG. 3. In step S21, the various operation parameters to be used in the control are acquired, in the same manner as step S11 in FIG. 4 mentioned above. Next, in step S22, determined is an EGR rate corresponding to a rate of the burned gas which is included in the gas filled in the combustion chamber 6. The EGR rate is determined depending on the operation state which is comprehended on the basis of the various operation parameters acquired in step S11. Since the specific setting method of the EGR rate is the same as the well-known method, a description thereof will be omitted.

Next, in step S23 and step S24, respective opening degrees of the throttle valve 16 and the EGR valve 32 are determined in such a manner that the EGR rate determined in step S22 is realized. In a succeeding step S25, the total fuel injection amount is determined on the basis of the current intake air amount, so that the combustion in accordance with the target air fuel ratio is carried out. In step S26, read out is a correction map which is updated each time the injection valve characteristic acquiring process is executed and corrected is the total fuel injection amount determined in step S25 on the basis of the correction map, so that the total fuel injection amount becomes a value on which the aged change of the injection characteristic of the first fuel injection valve 21 is reflected. Aside from the detail which will be mentioned later, the injection valve characteristic acquiring process specifies a correlation between the fuel injection amount of the first fuel injection valve 21 and the intake air amount at the moment when the combustion in accordance with the target air fuel ratio is realized, and sequentially updates the correction map. Accordingly, it is possible to reflect the aged change of the injection characteristic of the first fuel injection valve 21 on the fuel injection amount, by carrying out the correction on the basis of the correction map.

Figure 7:
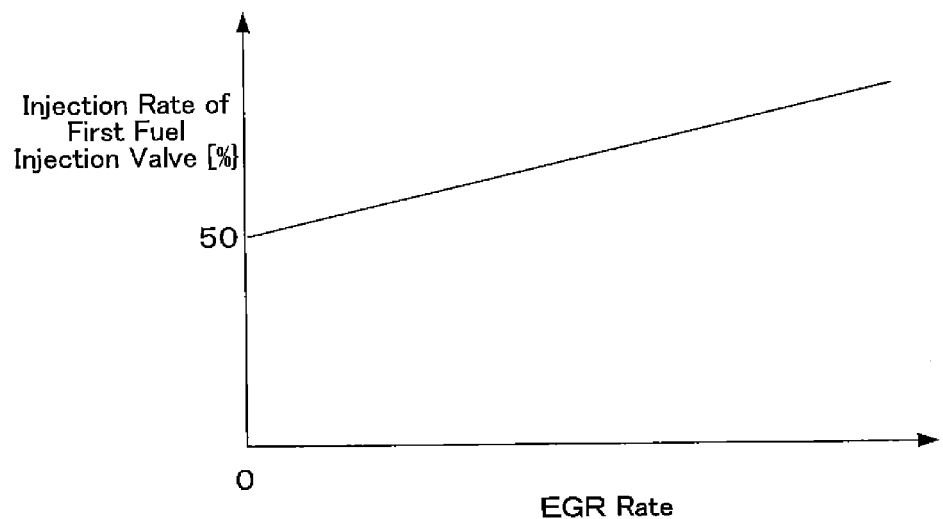
FIG. 7 is a view showing an example of an injection rate determination map.

Next, in step S27, an injection rate of each of the first fuel injection valve 21 and the second fuel injection valve 22 is determined. The injection rate is determined in such a manner that the injection rate of the first fuel injection valve 21 is enhanced in accordance with a rise of the EGR rate, in other words, in such a manner that the injection rate of the second fuel injection valve 22 is lowered in accordance with the rise of the EGR rate. Specifically, the injection rate of each of the fuel injection valves 21 and 22 is determined by utilizing an injection rate determination map which has a tendency as shown in FIG. 7. As is apparent from this drawing, the injection rate of the first fuel injection valve 21 is set to 50% in the case that the EGR rate is 0, and set so as to linearly increase in accordance with the rise of the EGR rate. Thereby, since the injection rate of the second fuel injection valve 22 is lowered in accordance with the rise of the EGR rate, the fuel amount to be fed to the burned gas region B is lowered in connection with a reduction of an oxygen concentration in the burned gas region B (refer to FIG. 1), which is caused by the rise of the EGR rate. Accordingly, it is possible to reduce the disproportional distribution of the fuel to the air-fuel mixture region A while preventing the fuel feed to the burned gas region B from becoming excessive. Since it is possible to prohibit the air-fuel mixture region A from becoming locally rich on the basis of the reduction of the disproportional distribution as mentioned above, it is possible to reduce the discharge amount of the carbon monoxide, the unburned carbon hydride or the like in comparison with the case that the fuel is fed only to the air-fuel mixture region A. The map in FIG. 7 is only one example, and it is possible to determine appropriately how much the injection rate of each of the fuel injection valves 21 and 22 is changed with respect to the change of the EGR rate. For example, it is possible to optimize the injection rate of each of the fuel injection valves 21 and 22 in connection with the EGR rate, by coordinating the EGR rate and the injection rate of each of the fuel injection valves 21 and 22, in such a manner that the discharge amount of the carbon monoxide, the unburned carbon hydride or the like becomes minimum. The optimization mentioned above can be realized by utilizing the well-known method such as an actual machine test, a simulation or the like.

In step S28, the fuel injection amount of the first fuel injection valve 21 is determined. The fuel injection amount is determined by multiplying the total fuel injection amount after being corrected in step S26 by the injection rate of the first fuel injection valve 21 which has been determined in step S27. The fuel injection amount of the first fuel injection valve 21 is calculated on the basis of the total fuel injection amount which is corrected on the basis of the correction map on which the aged change of the first fuel injection valve 21 is reflected. Therefore, the fuel injection amount of the first fuel injection valve 21 is, as a result, determined by utilizing the correlation between the fuel injection amount described in the correction map and the intake air amount.

In step S29, the fuel injection amount of the second fuel injection valve 22 is determined by multiplying the total fuel injection amount before being corrected which is determined in step S25 by the injection rate of the second fuel injection valve 22 which is determined in step S27. In step S30, the output value of the oxygen concentration sensor 27 is acquired, and it is comprehended whether the air fuel ratio is richer or leaner than the theoretical air fuel ratio which corresponds to the target air fuel ratio. In succeeding step S31, the fuel injection amount of the second fuel injection valve 22 which has been determined in step S29 is feedback corrected, in to cancel a displacement from the target air fuel ratio which has been comprehended in step S30. A correction amount per one time in the present process can be appropriately determined. On the basis of the execution of each process in step S28 and step S29, it is possible to prevent the displacement of the target air fuel ratio caused by the aged change of the injection characteristic of each of the fuel injection valves 21 and 22 only by utilizing the single oxygen concentration sensor 27, even if the fuel injection amounts which are actually injected from the first fuel injection valve 21 and the second fuel injection valve 22 respectively are not simultaneously comprehended.

In step S32, it is determined whether or not the load of the internal combustion engine 1A is a high load which is equal to or more than a predetermined value. In the case that the present load is not the high load, the step goes to step S33, and in the case that the present load is the high load, the step goes to step S34. In step S33, each of the fuel injection valves 21 and 22 is operated in such a manner that the fuel at the fuel injection amount determined in step S28 is injected from the first fuel injection valve 21, and the fuel at the fuel injection amount corrected in step S31 is injected from the second fuel injection valve 22. The injection timings of the respective fuel injection valves 21 and 22 in this case are the same timing as each other, and are set to a timing just before each of the intake valves 13 and 14 is opened.

In step S34, the valve moving mechanism 15 is operated in such a manner that the gas amount via the first intake port 11 becomes more than the gas amount via the second intake port 12 so as to make a difference in the valve opening characteristic between the intake valves 13 and 14. In order to make the gas amount via the first intake port 11 more than the gas amount via the second intake port 12, the valve opening characteristic may be differentiated in such a manner that an opening time area of the first intake valve 13 becomes larger than an opening time area of the second intake valve 14. Since the opening time area is specified by a working angle and a valve lift, both of the working angle and the valve lift may be differentiated between the first intake valve 13 and the second intake valve 14, or any one of the working angle and the valve lift may be differentiated between the first intake valve 13 and the second intake valve 14.

In step S35, the second fuel injection valve 22 is controlled in such a manner that the fuel is injected from the second fuel injection valve 22 in the first half of the intake stroke in which each of the first intake valve 13 and the second intake valve 14 is opened. Since the combustion of the burned gas region B shown in FIG. 1 is delayed in comparison with the air-fuel mixture region A, the knocking is more easily generated in the burned gas region B at the moment of the high load in comparison with the air-fuel mixture region A. Accordingly, since the fuel is vaporized in the burned gas region B and the burned gas region B is cooled by injecting the fuel from the second fuel injection valve 22 in the first half of the intake stroke in step S35, it is possible to suppress the generation of the knocking in the burned gas region B. Thereby, since a fuel increase for suppressing the knocking is not necessary, it is possible to improve a fuel consumption. In this way, if the first intake valve 13 and the second intake valve 14 are operated by the same valve opening characteristic at the moment when the burned gas region B is cooled, there is generated in connection with the temperature difference such a flow rate difference that the intake amount from the second intake port 12 is more than the intake amount from the first intake port 11. If the flow rate difference is generated, the boundary P between the air-fuel mixture region A and the burned gas region B tends to be collapsed, and there is a possibility that a stratifying level of these regions is lowered. In the present embodiment, since each of the intake valves 13 and 14 is operated to cancel the flow rate difference which can be generated in the case that the burned gas region B is cooled in step S34, the flow rate difference is corrected, and it is possible to suppress the reduction of the stratifying level. Therefore, it is possible to prevent the generation of the knocking while maintaining the stratifying level.

In step S36, an optimum ignition timing is determined depending on the operation state of the internal combustion engine 1A. The determination method of the ignition timing is the same as the well-known method. In succeeding step S37, the ignition plug 20 is operated in such a manner that a spark is generated from the ignition plug 20 at the ignition timing determined in step S36. Thereafter, the step goes back to the routine shown in FIG. 3 which corresponds to the main routine.

(Injection Valve Characteristic Acquiring Process)

Figure 6:
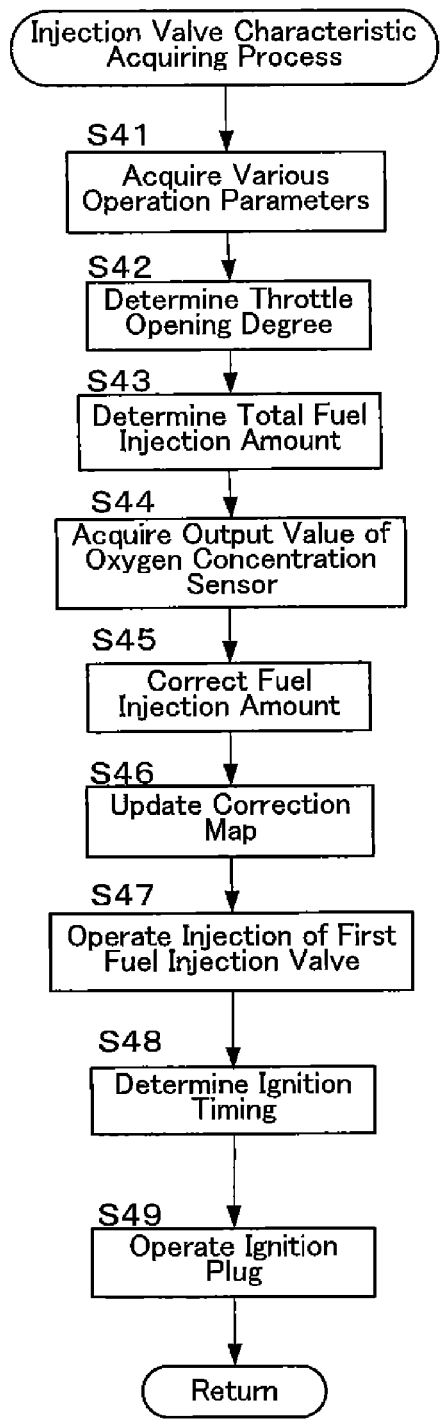
FIG. 6 is a flow chart showing an example of a routine of an injection valve characteristic acquiring process which is defined at step S6 in FIG. 3.

FIG. 6 shows an example of the routine of the injection valve characteristic acquiring process which is defined at step S6 in FIG. 3. In step S41, various operation parameters to be used for the process are acquired, in the same manner as each of the mentioned processes. In step S42, a throttle opening degree is determined on the basis of the operation parameters such as the accelerator opening degree, the rotation number of engine and the like which have been acquired in step S41. In succeeding step S43, the total fuel injection amount, which is the total of the fuel injection amounts of the respective fuel injection valves 21 and 22, is determined on the basis of the current intake air amount. In the process in FIG. 6, since the fuel is injected only from the first fuel injection valve 21 for comprehending the injection characteristic of the first fuel injection valve 21, the total fuel injection amount means the fuel injection amount of the first fuel injection valve 21.

Figure 8:
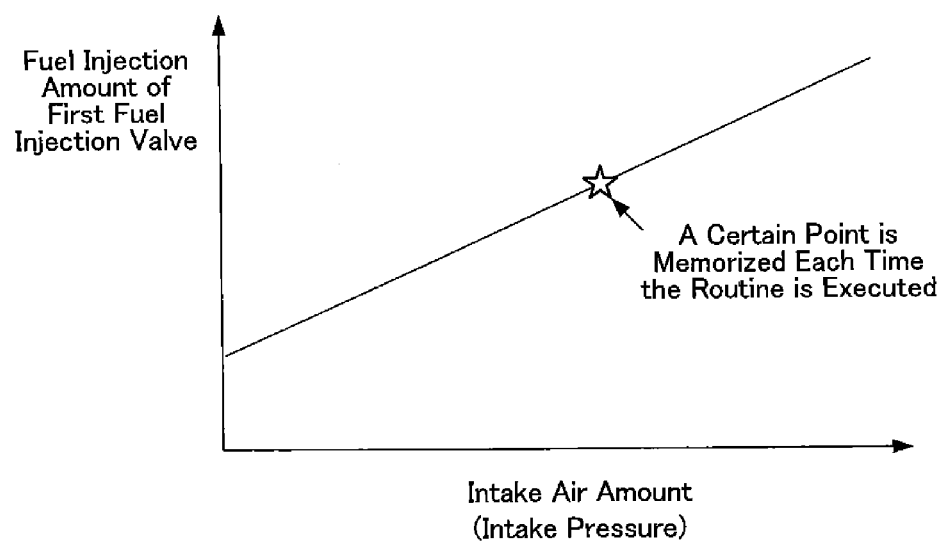
FIG. 8 is a view showing an example of a compensation map.

Next, in step S44, the output value of the oxygen concentration sensor 27 is acquired, and it is comprehended whether the air fuel ratio is richer or leaner than the theoretical air fuel ratio which corresponds to the target air fuel ratio. In succeeding step S45, the fuel injection amount which has been determined in step S43 is feedback corrected to cancel the displacement from the target air fuel ratio which has been comprehended in step S44. The fuel injection amount after being corrected in step S43 can be taken as the fuel injection amount at the moment when the combustion is realized in accordance with the target air fuel ratio. Accordingly, in step S46, the fuel injection amount after correction and the current intake air amount are stored in association with each other, in the correction map shown in FIG. 8 which the ECU 17 retains. Since the correction map is updated sequentially by repeating the process of step S46, specified is the correlation between the fuel injection amount of the first fuel injection valve 21, on which the aged change of the injection characteristic of the first fuel injection valve 21 is reflected, and the intake air amount. In this case, in the process of step S46, the correlation between the intake pressure in place of the intake air amount, and the fuel injection amount of the first fuel injection valve 21 is stored in the correction map, and in step S26 of the EGR control in FIG. 5 mentioned above, the the total fuel injection amount can be corrected on the basis of the correction map. Even in this case, the fuel injection amount of the first fuel injection valve can be determined by utilizing the correlation between the fuel injection amount of the first fuel injection valve 21 and the intake pressure, which is described in the correction map.

Next, in step S47, the first fuel injection valve 21 is injected in such a manner that the fuel at the fuel injection amount which has been corrected in step S45 is injected from the first fuel injection valve 21. In step S48, an optimum ignition timing depending on an operation state of the internal combustion engine 1A. The determination method of the ignition timing is the same as the well-known method. In succeeding step S49, the ignition plug 20 is operated in such a manner that the spark is generated from the ignition plug 20 at the ignition timing which has been determined in step S48. Thereafter, the step goes back to the routine in FIG. 3 which corresponds to the main routine.

According to the first embodiment, in the case that the air-fuel mixture region A and the burned gas region B are formed within the combustion chamber 6, the fuel is injected from each of the first fuel injection valve 21 and the second fuel injection valve 22 depending on the EGR rate. Thereby, since the fuel is fed not only to the air-fuel mixture region A but also to the burned gas region B, the disproportional distribution to the fuel in the air-fuel mixture region A is reduced. Accordingly, since it is possible to prohibit the air-fuel mixture region A from becoming locally rich, it is possible to reduce the discharge amount of the carbon monoxide, the unburned carbon hydride and the like in comparison with the case that the fuel is fed only to the air-fuel mixture region A.

In the first embodiment, the ECU 17 respectively serves as the injection amount calculating device of the present invention by executing step S25 in FIG. 5, serves as the injection rate determining device of the present invention by executing step S27, serves as the injection control device of the present invention by executing step S28 to step S31, step S33 and step S35, serves as the EGR control device of the present invention by executing step S1 and step S2 in FIG. 3, and serves as the characteristic acquiring device of the present invention by executing the control routine in FIG. 6.

Second Embodiment

Figure 9:
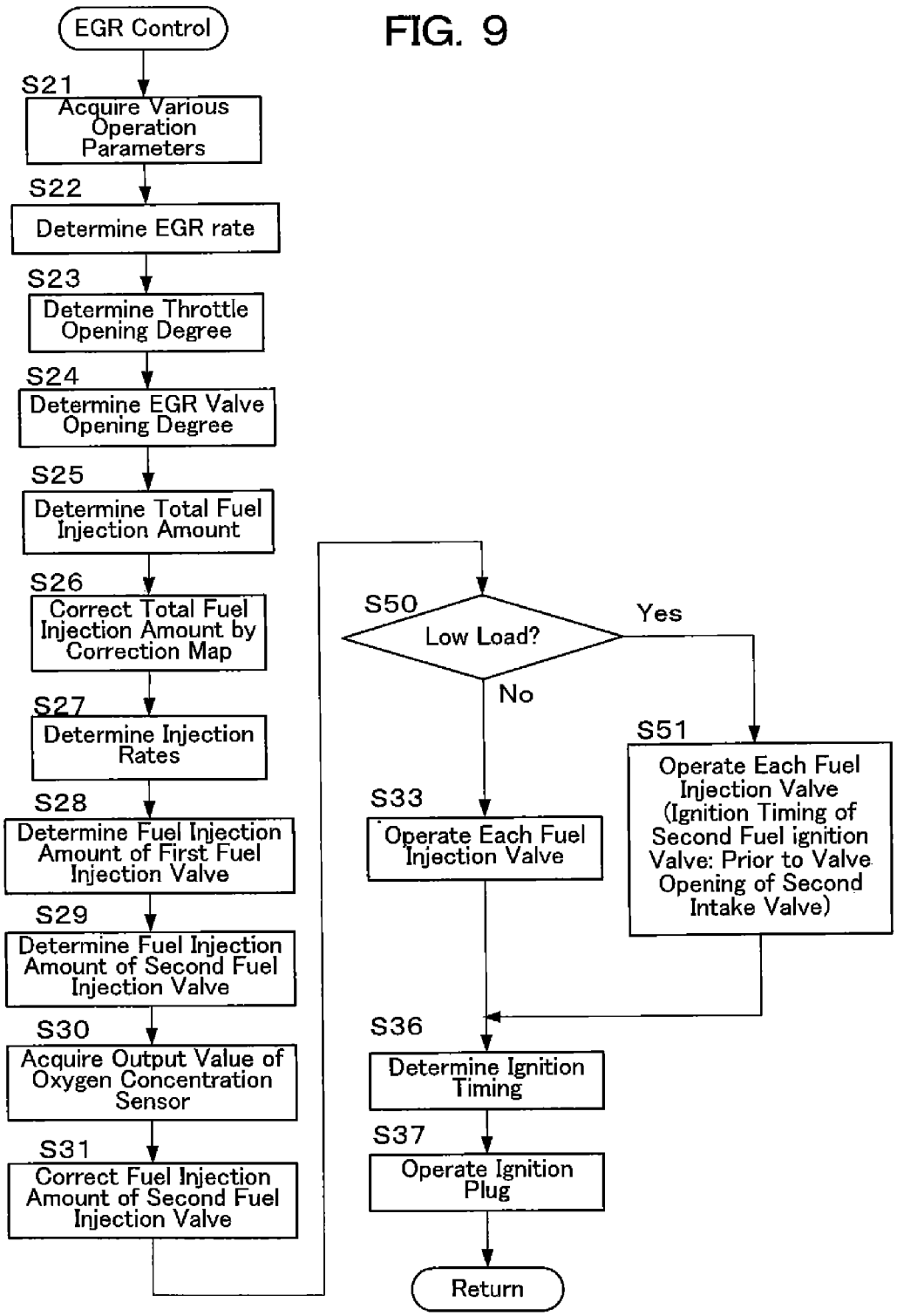
FIG. 9 is a flow chart showing an example of a control routine of an EGR control in accordance with a second embodiment.

Next, a description will be given about a second embodiment of the present invention with reference to FIG. 9. The second embodiment is in common with the first embodiment except a point that there is a difference in the control content of the EGR control. Accordingly, in the following, a description of the common portion with the first embodiment will be omitted. FIG. 9 is a flow chart showing an example of a control routine of an EGR control in accordance with the second embodiment. In FIG. 9, with regard to the same processes as those in FIG. 5, the same reference numerals are attached and the description will be omitted.

The second embodiment is characterized by the control of the fuel injection timing of the second fuel injection valve 22 in a low load case where the load is equal to or less than a predetermined value. In other words, in step S50 in FIG. 9 it is determined whether or not the present load is the low load. The step goes to step S33 in the case of not low load, and the step goes to step S51 in the case of low load. In step S51, the second fuel injection valve 22 is controlled in such a manner that the fuel is injected from the second fuel injection valve 22 before the second intake valve 14 is opened. In this case, the fuel injection timing of the first fuel injection valve 21 is the same as the timing in the cases other than the low load case. Since the combustion of the burned gas region B is delayed in comparison with the air-fuel mixture region A, the unburned carbon hydride tends to be generated in the burned gas region B in the low load case. Accordingly, the fuel receives the heat from the wall surface of the second intake port 12 so as to be vaporized, by been injected by the second fuel injection valve 22 before the second intake valve 14 is opened. Then, the gas in the high temperature state is taken into the combustion chamber 6. Thereby, since the burned gas region B can be easily maintained at the high temperature, it is possible to reduce the generating amount of the unburned carbon hydride. The ECU 17 serves as the injection control device of the present invention by executing step S51 in FIG. 9.

In this case, as a modified example of the second embodiment, the fuel injection by the second fuel injection valve 22 can be carried out by being divided into two times, one is the time before the valve opening of the second intake valve 14, and the other is the time in the first half of the intake stroke. In this case, it can be set that as the load is lower, the fuel injection amount of the first time is made larger than the fuel injection amount of the second time. Then, the injection rates of these injections can be changed depending on a magnitude of the load. In other words, the injection rate between the former and the latter is changed from 1:0 to 0:1 in accordance with the load. According to this modified example, it is possible to carry out the respective controls of the first embodiment and the second embodiment, and further, it is possible to change the control content gradually from the control for the load case to the control for the high load case.

Third Embodiment

Figure 10:
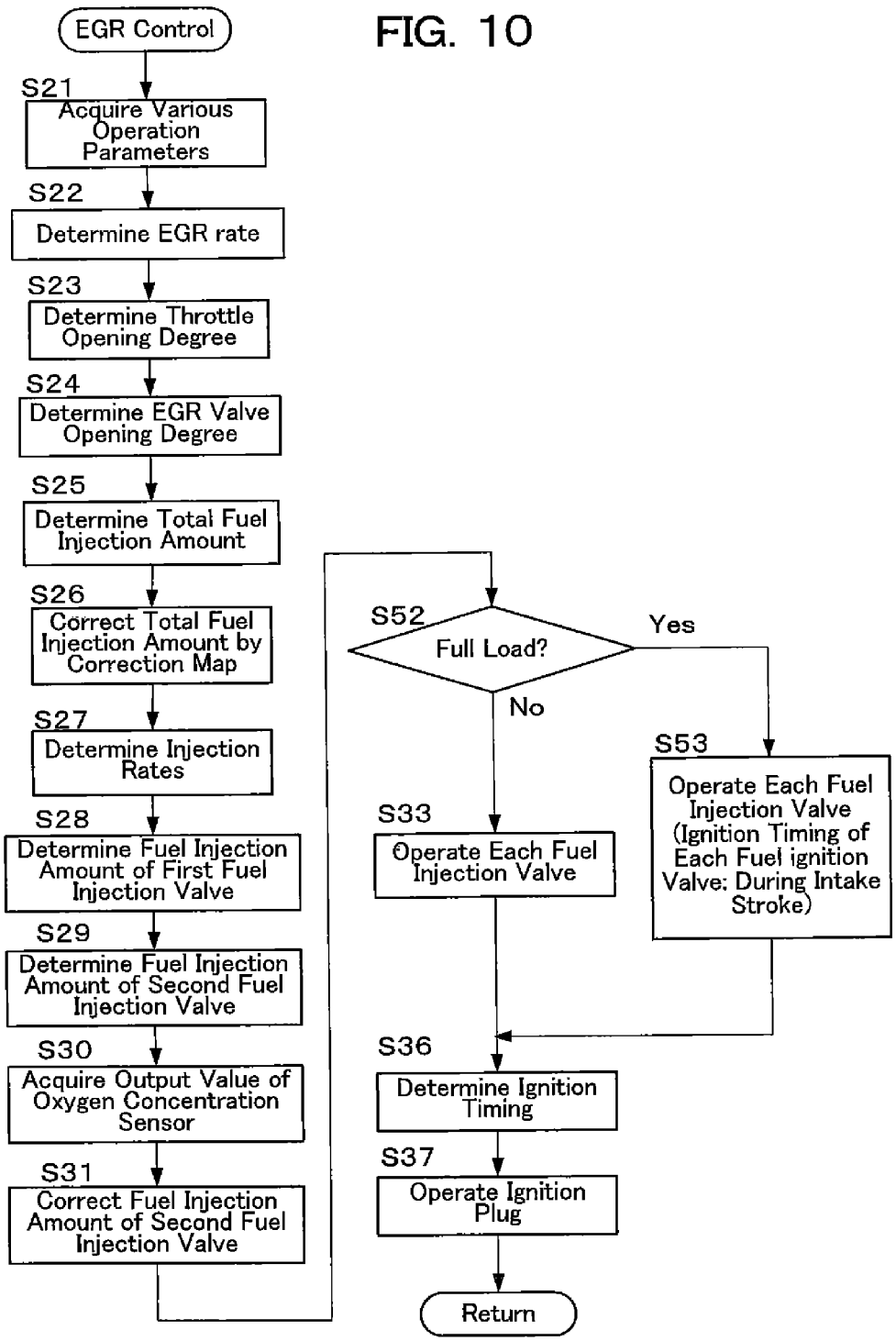
FIG. 10 is a flow chart showing an example of a control routine of an EGR control in accordance with a third embodiment.

Next, a description will be given about a third embodiment of the present invention with reference to FIG. 10. The third embodiment is in common with the first embodiment except a point that there is a difference in the control content of the EGR control. Accordingly, in the following, a description of the common portion with the first embodiment will be omitted. FIG. 10 is a flow chart showing an example of a control routine of an EGR control in accordance with the third embodiment. In FIG. 10, with regard to the same processes as those in FIG. 5, the same reference numerals are attached and a description will be omitted.

The third embodiment is characterized by a control of the fuel injection timing of each of the fuel injection valves 21 and 22 in a full load case where the load is a critical value. In other words, in step S52 in FIG. 10, it is determined whether or not the present load is the full load. The step goes to step S33 in the case of not the full load case, and the step goes to step S53 in the case of the full load case. In step S53, each of the fuel injection valves 21 and 22 is controlled in such a manner that the fuel is injected in each of the first fuel injection valve 21 and the second fuel injection valve 22 during the intake stroke. According to this embodiment, the fuel is injected from each of the fuel injection valves during the intake stroke, whereby the fuel is vaporized so as to lower the temperature within the combustion chamber. Thereby, it is possible to obtain both of the suppression of the knocking and the improvement of the filling efficiency. The ECU 17 serves as the injection control device of the present invention by executing step S53 in FIG. 10.

Fourth Embodiment

Figure 11:
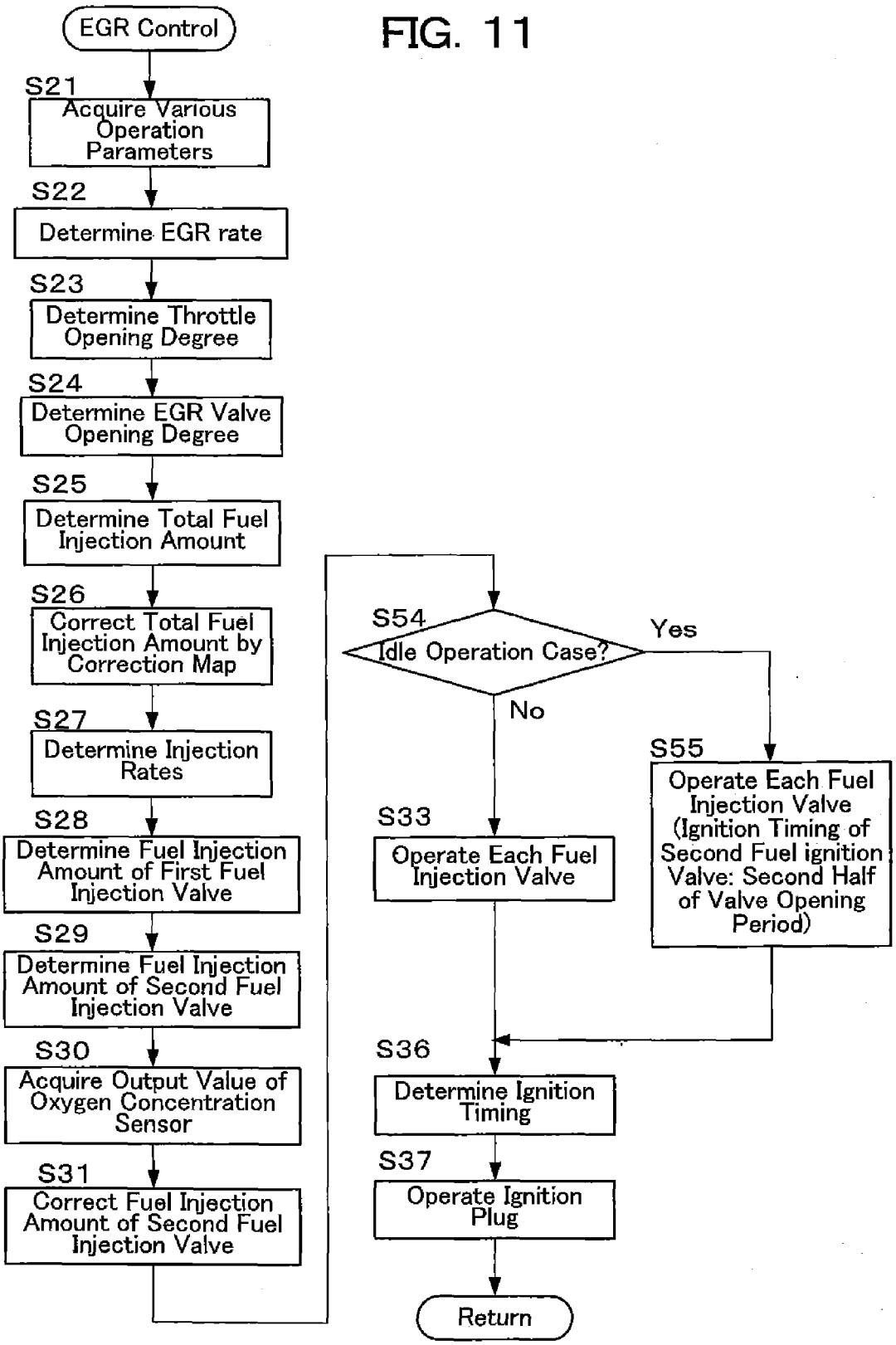
FIG. 11 is a flow chart showing an example of a control routine of an EGR control in accordance with a fourth embodiment.
Figure 12:
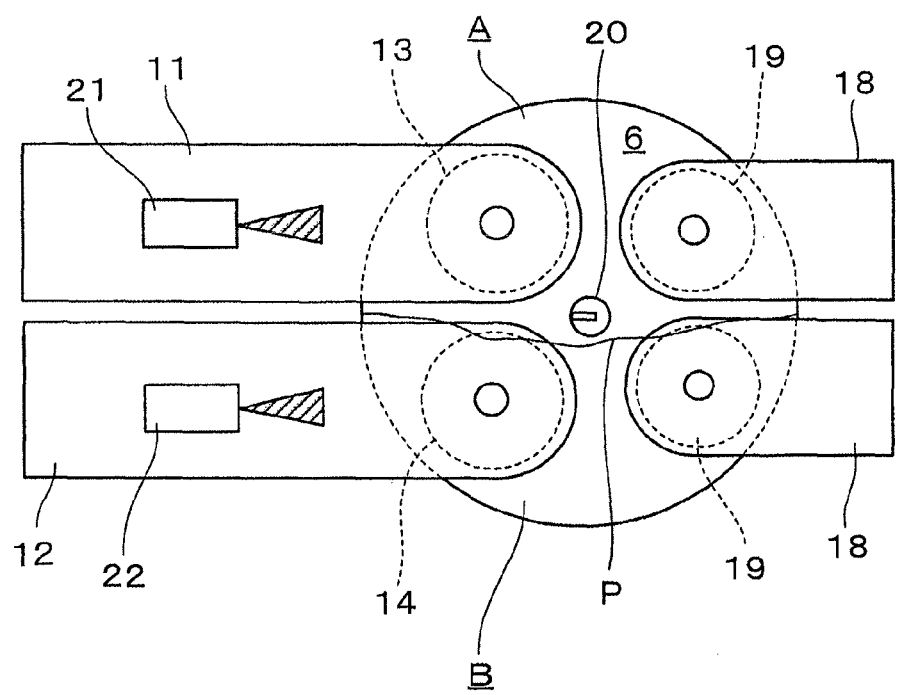
FIG. 12 is an explanatory view describing an operation of the fourth embodiment.

Next, a description will be given about a fourth embodiment of the present invention with reference to FIG. 11 and FIG. 12. The fourth embodiment is in common with the first embodiment except a point that there is a difference in the control content of the EGR control. Accordingly, in the following, a description of the common portion with the first embodiment will be omitted. FIG. 11 is a flow chart showing an example of a control routine of an EGR control in accordance with the fourth embodiment. FIG. 12 is an explanatory view describing operations of the fourth embodiment. In FIG. 11, with regard to the same processes as those in FIG. 5, the same reference numerals are attached and a description will be omitted.

The fourth embodiment is characterized by a control of the fuel injection timing of the second fuel injection valve 22 in an idle operation case where the load is extremely small. In other words, in step S54 in FIG. 11, it is determined whether or not the present case is the idle operation case, the step goes to step S33 in the case of not idle operation case, and the step goes to step S55 in the case of the idle operation case. In step S55, the second fuel injection valve 22 is controlled in such a manner that the fuel is injected by the second fuel injection valve 22 in the second half of the valve opening period of the second intake valve 14. According to this embodiment, the vaporization of the fuel advances in the burned gas region B even after the valve close of the second intake valve 14. Thereby, the temperature of the burned gas region B is lowered so as to be contracted. Accordingly, as shown in FIG. 12, since the boundary P to the air-fuel mixture region A is shifted to the burned gas region B side from the center of the combustion chamber 6, the ignition plug 20 arranged in the center of the combustion chamber 6 is positioned within the air-fuel mixture region A. Accordingly, since it is possible to ignite in the air-fuel mixture region A in which the concentration of the burned gas is low, in the idle operation case where the flammability is deteriorated, it is possible to improve the flammability in the idle operation case which tends to be lowered by arranging the ignition plug 20 in the center of the combustion chamber 6. The ECU 17 serves as the injection control device of the present invention by executing step S55 in FIG. 11.

Fifth Embodiment

Next, a description will be given about a fifth embodiment of the present invention with reference to FIG. 13 and FIG.

14. FIG. 13 is a top view schematically showing a substantial part of a spark ignition type internal combustion engine in accordance with the fifth embodiment. FIG. 14 is a flow chart showing an example of a control routine of an EGR control in accordance with the fifth embodiment. As is apparent from FIG. 13, an internal combustion engine 1B in accordance with the fifth embodiment is the same as the internal combustion engine 1A in accordance with the first embodiment except the number and the position of the ignition plugs. Further, the control in accordance with the fifth embodiment is in common with the first embodiment except a point that there is a difference in the control content of the EGR control. In the following, a description of the common portion with the first embodiment will be omitted.

The internal combustion engine 1B is provided as the ignition device with a first ignition plug 20A which is arranged in the combustion chamber 6 in such a manner as to be biased to the side of the first intake port 11, and a second ignition plug 20B which is arranged in the combustion chamber 6 in such a manner as to be biased to the side of the second intake port 12. The fifth embodiment is characterized by a control of an ignition timing of each of the ignition plugs 20A and 20B in the EGR control. In other words, in step S56 in FIG. 14, it is determined whether or not the load is other than the low load, that is, the load is a middle or high load case. The step goes to step S57 in the case of not the middle or high load case, and the step goes to step S58 in the case of the middle or high load case.

In step S57, it is determined that the ignition timing of each of the ignition plugs 20A and 20B depending on an operation state of the internal combustion engine 1B. Although this determination method of the ignition timing is the same as the well-known method, the ignition timings of the respective ignition plugs 20A and 20B are set simultaneously here. In step S58, determined is the ignition timings of the respective ignition plugs 20A and 20B that the ignition of the second ignition plug 20B is carried out earlier than the ignition of the first ignition plug 20A. The specific ignition timing of each of the ignition plugs 20A and 20B may be appropriately determined depending on the operation state of the internal combustion engine 1B as long as an anteroposterior relationship of the timing can be kept. In succeeding step S59, operated is each of the ignition plugs 20A and 20B in such a manner that the spark is generated from each of the ignition plugs 20A and 20B at the ignition timing which has been determined in step S57 or step S58.

Figure 13:
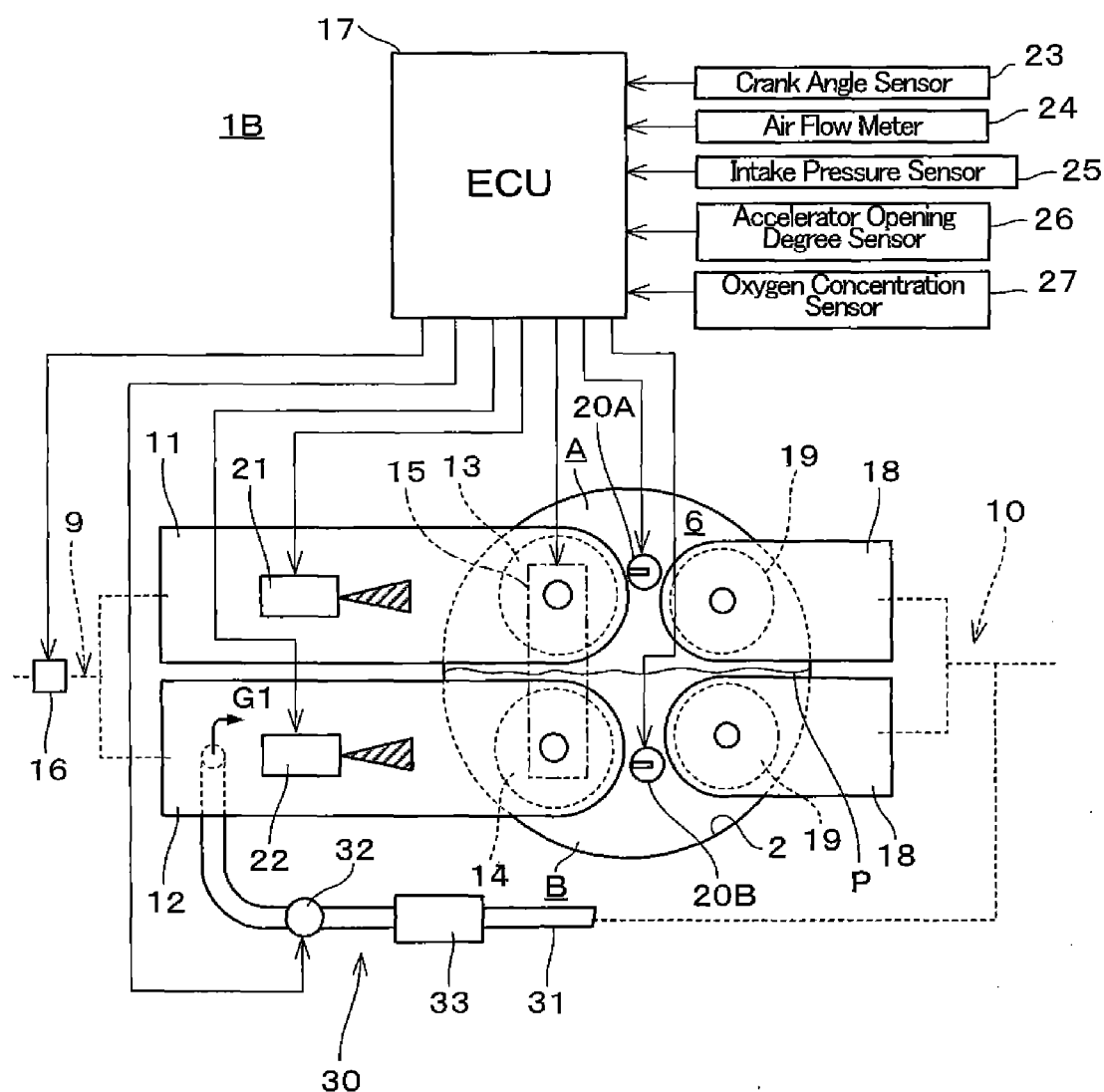
FIG. 13 is a top view schematically showing a substantial part of a spark ignition type internal combustion engine in accordance with a fifth embodiment.
Figure 14:
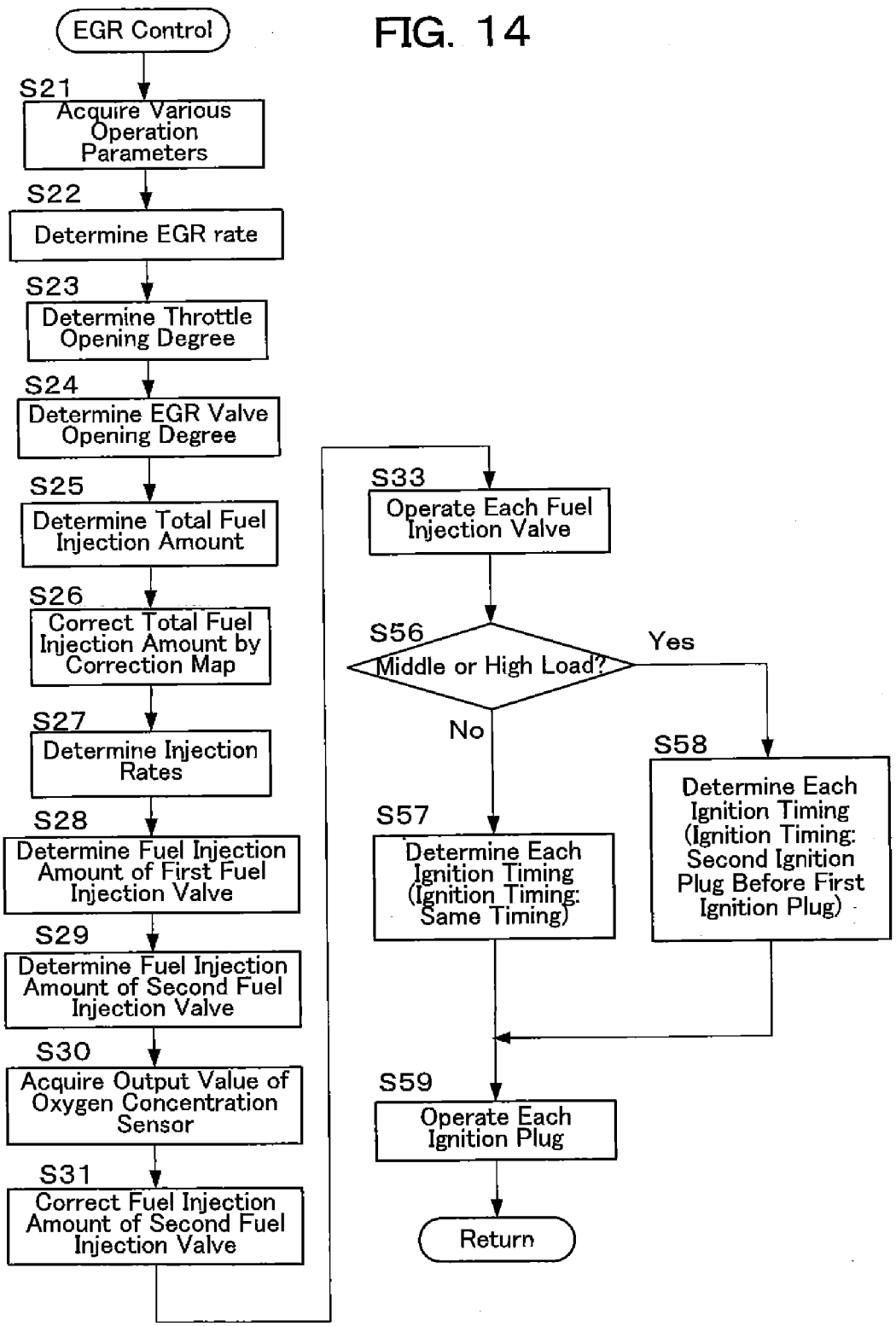
FIG. 14 is a flow chart showing an example of a control routine of an EGR control in accordance with the fifth embodiment.

The burned gas region B shown in FIG. 13 is worse in the flammability in comparison with the air-fuel mixture region A so as to cause a delay in the combustion, however, in accordance with the fifth embodiment, since the ignition by the second ignition plug 20B is carried out earlier than the ignition by the first ignition plug 20B in the middle or high load case, it is possible to start the combustion of the burned gas region B earlier than the combustion of the air-fuel mixture region A. As a result, since it is possible to sufficiently secure the combustion period of the burned gas region B in which the unburned carbon hydride tends to be generated, it is possible to reduce the discharge of the unburned carbon hydride. The ECU 17 serves as the ignition control device of the present invention by executing step S58 and step S59 in FIG. 14.

Sixth Embodiment

Figure 15:
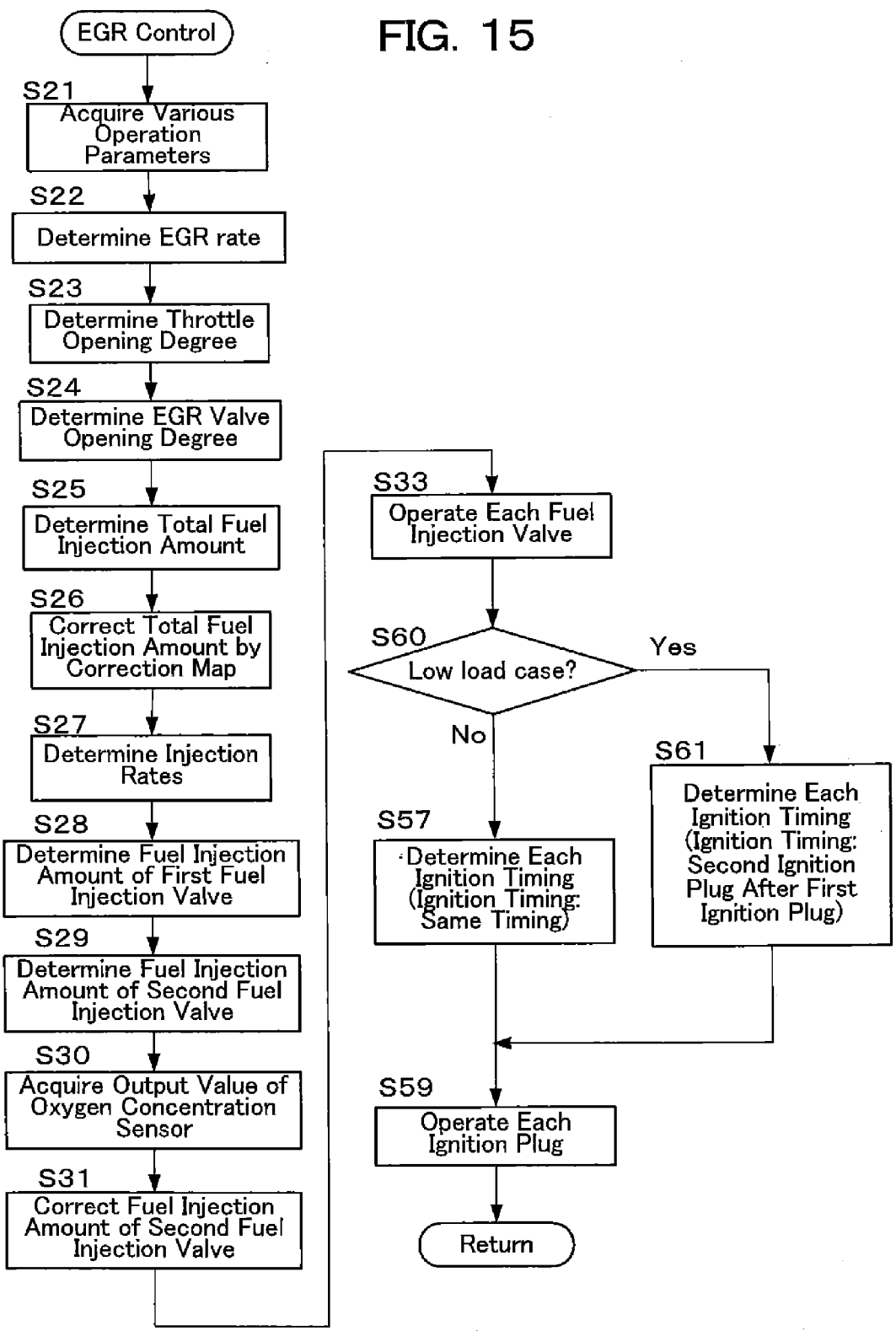
FIG. 15 is a flow chart showing an example of a control routine of an EGR control in accordance with a sixth embodiment.
Figure 16:
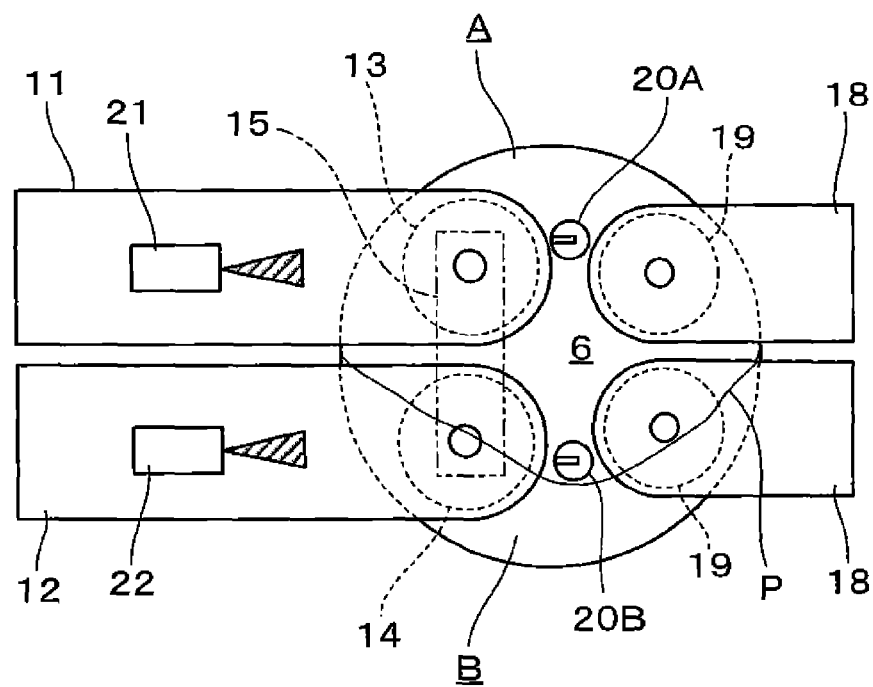
FIG. 16 is an explanatory view describing an operation of the sixth embodiment.

Next, a description will be given about a sixth embodiment of the present invention with reference to FIG. 15 and FIG. 16. The sixth embodiment is in common with the fifth embodiment except a point that there is a difference in the control content of the EGR control. Accordingly, in the following, a description of the common portion with the fifth embodiment will be omitted. FIG. 15 is a flow chart showing an example of a control routine of an EGR control in accordance with the sixth embodiment. FIG. 16 is an explanatory view describing operations of the sixth embodiment. In FIG. 15, with regard to the same processes as those in FIG. 14, a description will be omitted and the same reference numerals are attached.

The sixth embodiment is characterized by a control of the ignition timing of each of the ignition plugs 20A and 20B in the low load case that the load is equal to or less than a predetermined value. In other words, in step S60 in FIG. 15, it is determined whether or not the present case is the low load case, the step goes to step S57 in the case of not the low load case, and the step goes to step S61 in the case of the low load case. In step S61, determined is the ignition timing of each of the ignition plugs 20A and 20B in such a manner that the ignition of the second ignition plug 20B is carried out later than (after) the ignition of the first ignition plug 20A. In succeeding step S59, operated is each of the ignition plugs 20A and 20B in such a manner that the spark is generated from each of the ignition plugs 20A and 20B at the ignition timing which is determined in step S57 or step S61.

In the case that the temperature within the combustion chamber 6 is low and the present case is the low load case, there is a possibility that an accidental fire is generated in the burned gas region B. According to the fifth embodiment, as shown in FIG. 16, the boundary P moves to the burned gas region B on the basis of a flame propagation which is formed by the preceding combustion of the air-fuel mixture region A. Thereby, it is possible to enhance the pressure and the temperature of the burned gas region B by utilizing the flame propagation, and it is possible to ignite by the second ignition plug 20B in a state in which the pressure and the temperature are enhanced. Thereby, it is possible to improve the flammability of the burned gas region B. In the sixth embodiment, the ECU 17 serves as the ignition control device of the present invention by executing step S61 and step S59 in FIG. 15.

Seventh Embodiment

Figure 17:
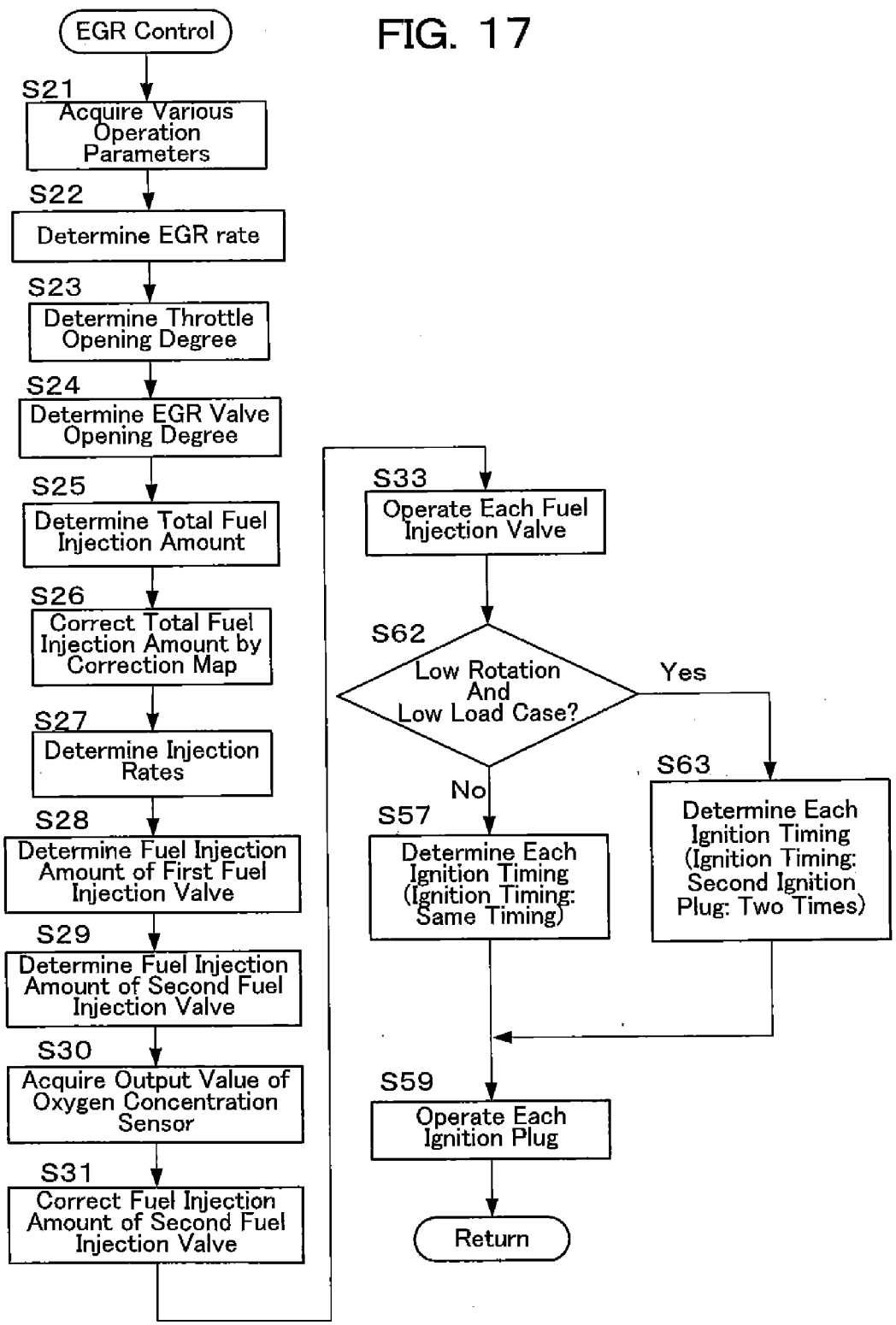
FIG. 17 is a flow chart showing an example of a control routine of an EGR control in accordance with a seventh embodiment.
Figure 18:
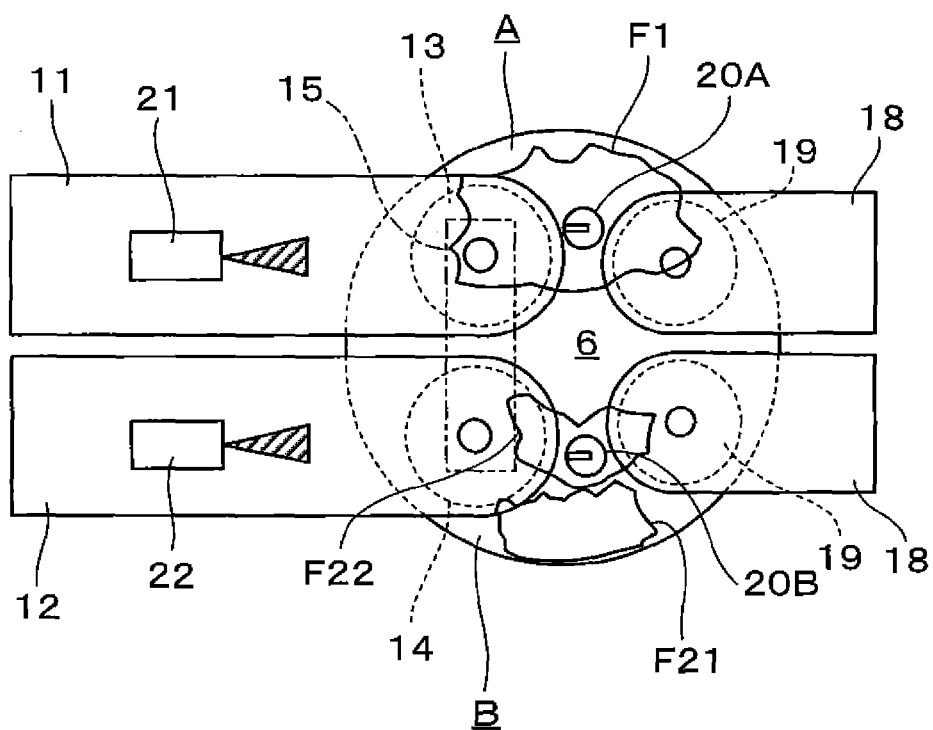
FIG. 18 is an explanatory view describing an operation of the seventh embodiment.

Next, a description will be given about a seventh embodiment of the present invention with reference to FIG. 17 and FIG. 18. The seventh embodiment is in common with the fifth embodiment except a point that there is a difference in the control content of the EGR control. Accordingly, in the following, a description of the common portion with the fifth embodiment will be omitted. FIG. 17 is a flow chart showing an example of a control routine of an EGR control in accordance with the seventh embodiment. FIG. 18 is an explanatory view describing operations of the seventh embodiment. In FIG. 17, with regard to the same processes as those in FIG. 14, a description will be omitted and the same reference numerals are attached.

The seventh embodiment is characterized by a control of the ignition timing of each of the ignition plugs 20A and 20B in a low rotation and low load case in which the rotation number of engine is equal to or less than a predetermined value, and a load is equal to or less than a predetermined value. In other words, in step S62 in FIG. 17, it is determined whether or not the present case is the low rotation and low load case, the step goes to step S57 in the case that the present case is not the low rotation and low load case, and the step goes to step S63 in the case that the present case is the low rotation and low load case. In step S63, the ignition timings of the first and second ignition plugs 20A and 20B is determined in such a manner that one time of the ignition timing is determined for the first ignition plug 20A, and two times of the ignition timings are determined for the second ignition plug 20B. The ignition timing of the first ignition plug 20A and the first ignition timing of the second ignition plug 20B may be set to the same time, or may be differentiated from each other. For example, the first ignition timing of the second ignition plug 20B may be delayed from the ignition timing of the first ignition plug 20A. In succeeding step S59, each of the ignition plugs 20A and 20B is operated in such a manner that the spark is generated from each of the ignition plugs 20A and 20B at the ignition timing which has been determined in step S57 or step S63. In this case, the ignition frequency of the second ignition plug 20B can be set to three or more times.

A flame propagation speed of the burned gas region B is slower than a frame propagation speed of the air-fuel mixture region A since the concentration of the burned gas is high. According to the seventh embodiment, it is possible to move the unburned air-fuel mixture to the burned gas region B side by utilizing the flame propagation which is formed by the combustion of the air-fuel mixture region B. It is possible to sequentially ignite by plural times of ignitions by the second ignition plug 20B, the unburned air-fuel mixture which has moved to the burned gas region B side on the basis of the combustion of the air-fuel mixture region A. In other words, as shown in FIG. 18, since a frame propagation F21 which is obtained by the first ignition of the second ignition plug 20B in accordance with the flame propagation F1 in the air-fuel mixture region A side is moved to an outer side in a radial direction of the combustion chamber 6, and the unburned air-fuel mixture is delivered to the periphery of the second ignition plug 20B, a good flame propagation F22 can be obtained at the moment of the second ignition. Thereby, it is possible to quicken the combustion speed within the combustion chamber 6 and it is possible to suppress the generation of the knocking.

Eighth Embodiment

Figure 19:
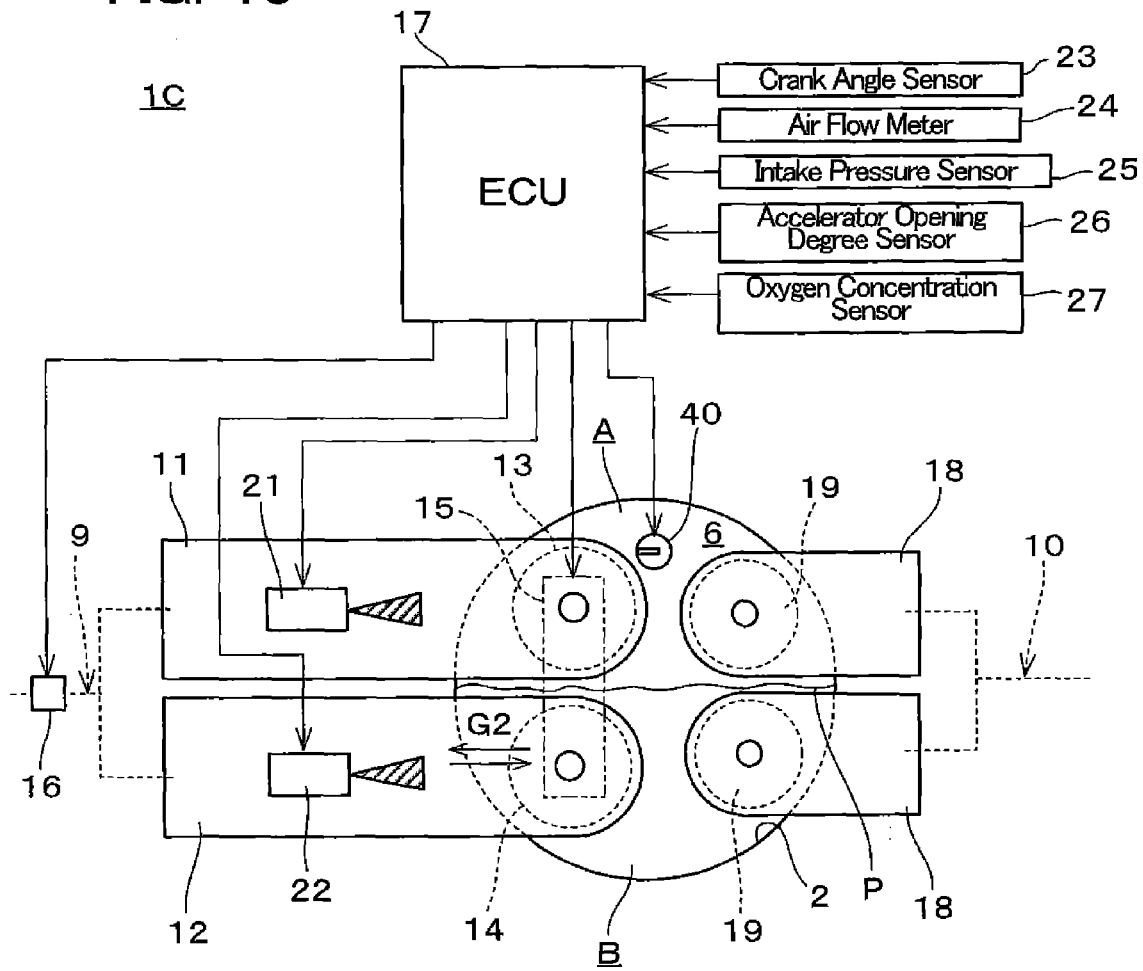
FIG. 19 is a top view schematically showing a substantial part of a spark ignition type internal combustion engine in accordance with an eighth embodiment.

Next, a description will be given about an eighth embodiment of the present invention with reference to FIG. 19 to FIG. 23. FIG. 19 is a top view schematically showing a substantial part of the spark ignition type internal combustion engine in accordance with the eighth embodiment. In this case, in FIG. 19, the same reference numerals are attached to the structures which are in common with the first embodiment.

Figure 20:
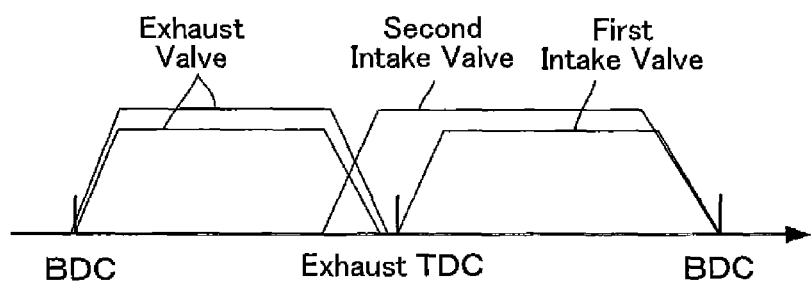
FIG. 20 is an explanatory view schematically showing a lift curve of each intake valve at the moment of carrying out an internal EGR.

An internal combustion engine 1C is structured such that an ignition plug 40 serving as the ignition device is arranged within the combustion chamber 6 so as to be biased to a side of the first intake port 11. Further, in the case of introducing the burned gas into the combustion chamber 6, the internal combustion engine 1C introduces the burned gas to be discharged from the combustion chamber 6 in the exhaust stroke as an internal EGR gas G2 into the combustion chamber 6 after leading the burned gas to the second intake port 12. As a result of limitedly introducing the burned gas into the second intake port 12, the air-fuel mixture region A is formed in the side of the first intake port 11, and, within the combustion chamber 6 the burned gas region is formed in the side of the second intake port 12. Whereby the air-fuel mixture region A and the burned gas region B are stratified (a stratified state). The internal combustion engine 1C can securely carry out the ignition in the air-fuel mixture region A by the ignition plug 40 in the case of the stratified state, and can promote the self-ignition by utilizing the high temperature burned gas which is included in the burned gas region B in the second half of the combustion. Accordingly, it is possible to suppress the discharge of the unburned carbon hydride. The internal EGR is realized by operating the valve moving mechanism 15 so that the second intake valve 14 is opened in the second half of the exhaust stroke in a state in which the first intake valve 13 is closed. FIG. 20 is an explanatory view schematically showing a lift curve of each of the intake valves 13 and 14 when the internal EGR is executed. As is apparent from this drawing, when the internal EGR is carried out, the second intake valve 14 is opened in the second half of the exhaust stroke, and the first intake valve 13 is opened after the exhaust stroke. Further, the intake valves 13 and 14 are closed simultaneously. In other words, in an illustrated case, a phase difference is given to the valve opening timings of the intake valves 13 and 14.

Figure 21:
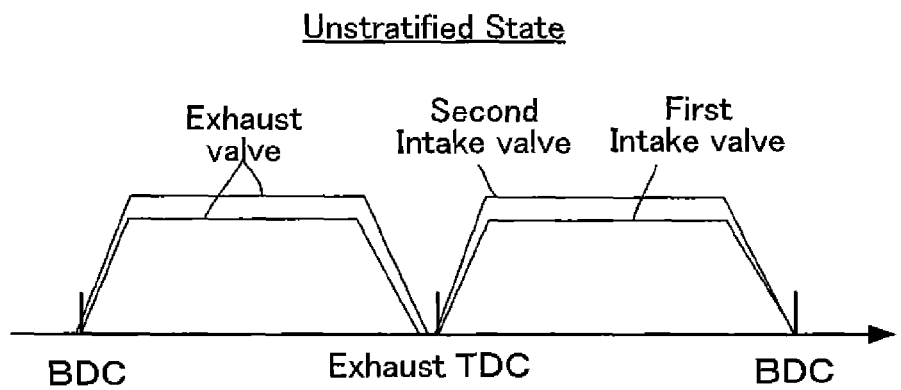
FIG. 21 is an explanatory view schematically showing a lift curve of each intake valve at the moment of prohibiting the execution of the internal EGR.

On the other hand, the internal combustion engine 1C is structured such that the valve moving mechanism 15 is operated in such a manner that each of the intake valves 13 and 14 is opened after the exhaust stroke, in the case of limiting the introduction of the burned gas into the combustion chamber 6. Thereby, since the burned gas is limited to be led to each of the intake ports 11 and 12 during the exhaust stroke, it is limited that two regions A and B are formed within the combustion chamber 6 (an unstratified state). FIG. 21 is an explanatory view schematically showing a lift curve of each of the intake valves 13 and 14 when the execution of the internal EGR is prohibited. As is apparent from this drawing, when the internal EGR is prohibited, the respective intake valves 13 and 14 are opened after the exhaust stroke, and are closed at the same timing. In the case of FIG. 21, since a valve overlap does not exist, an inflow of the burned gas into the combustion chamber 6 is completely shut off.

As can be understood from the description mentioned above, since the valve moving mechanism 15 can switch the states between the stratified state and the unstratified state by operating each of the intake valves 13 and 14, the valve moving mechanism 15 corresponds to the internal EGR device of the present invention. Further, since the stratification is achieved by executing the internal EGR, the valve moving mechanism 15 also serves as the stratifying device of the present invention. In this case, with respect to the lift amount of each of the intake valves 13 and 14 shown in FIG. 20 and FIG. 21, the amount of the second intake valve 14 is larger than the amount of the first intake valve 13. However, the lift amounts of the intake valves 13 and 14 may be equal to each other.

Figure 22:
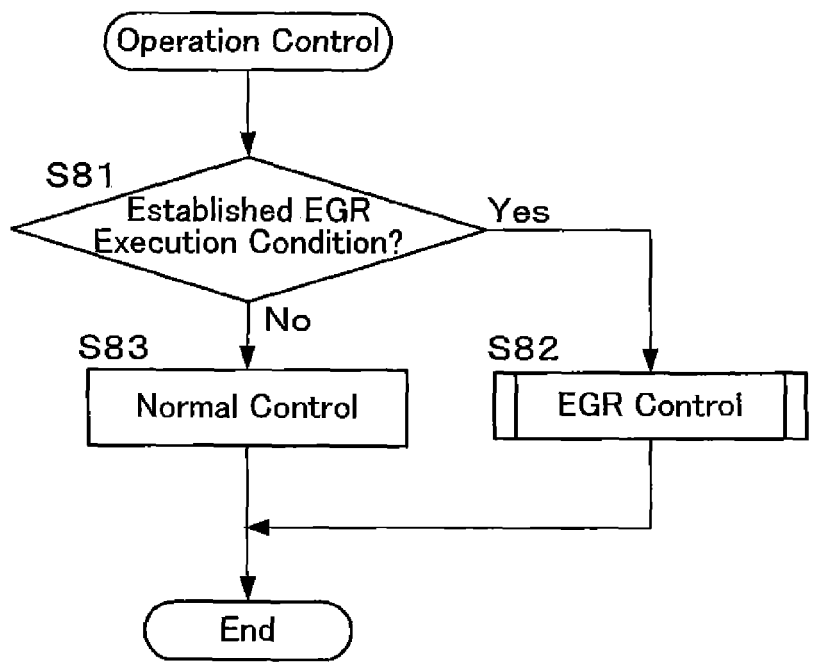
FIG. 22 is a flow chart showing an example of a control routine of an operation control which is carried out with respect to the internal combustion engine in FIG. 19.

FIG. 22 is a flow chart showing an example of a control routine of an operation control which the ECU 17 executes. A program of this routine is retained in a memory device such as a ROM or the like which the ECU 17 has, and is fitly read so as to be executed repeatedly at a predetermined time interval. First of all, in step S81, it is determined whether or not the EGR execution condition described in the first embodiment is established. In the case that the EGR execution condition is established, the step goes to step S82, and executes an EGR control. On the other hand, in the case that the EGR execution condition is not established, the step goes to step S83 and executes the normal control. Thereafter, the routine in FIG. 22 is finished. The normal control is a control for carrying out the operation in the state in which the burned gas is not included in the combustion chamber 6. Since the normal control in the present embodiment is the same as the operation control of the conventional internal combustion engine, a detailed description thereof will be omitted.

Figure 23:
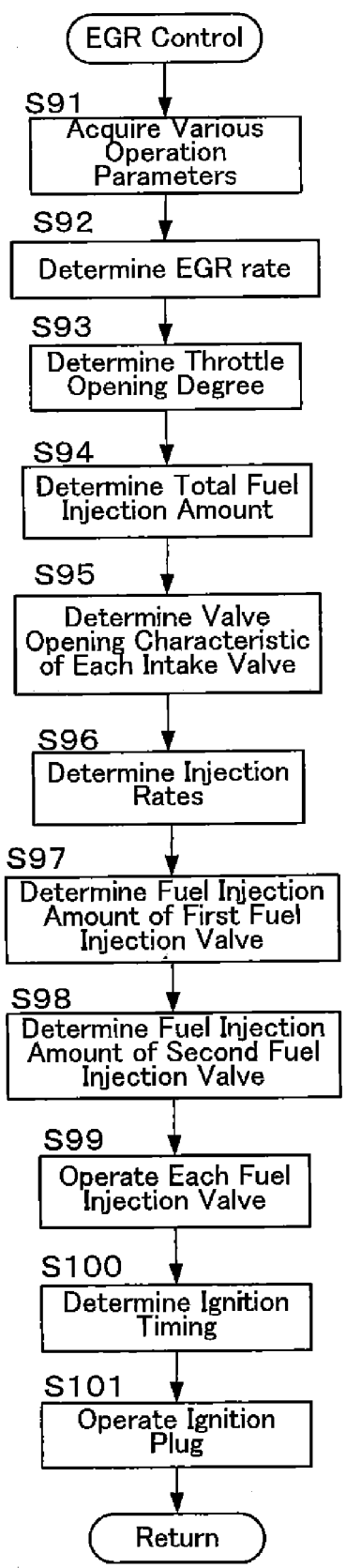
FIG. 23 is a flow chart showing an example of a control routine of an EGR control which is defined at step S82 in FIG. 22.

FIG. 23 shows an example of the control routine of the EGR control which is defined in step S82 in FIG. 22. In step S91, various operation parameters to be used in the control are acquired, in the same manner as each of the embodiments mentioned above. Next, in step S92, an EGR rate corresponding to the operation state is determined. In step S93, a throttle opening degree is determined on the basis of the operation parameters such as the accelerator opening degree, the intake pressure and the like which have been acquired in step S91. Next, in step S94, a total fuel injection amount is determined depending on the intake air amount in such a manner that a theoretical air fuel ratio corresponding to the target air fuel ratio is realized.

In step S95, a valve opening characteristic of each of the intake valves 13 and 14 is determined on the basis of the parameters such as the intake pressure and the like in such a manner that an EGR rate of the combustion chamber 6 comes to be the EGR rate which has been determined in step S92. Specifically, in order to realize the EGR rate determined in step S92, determined are the valve opening timing and the lift amount of the second intake valve 14 which is opened during the exhaust stroke, and to the first intake valve 13, set is a valve opening characteristic which is different from the second intake valve 14 (refer to FIG. 20). Further, the lift amount of the second intake valve 14 at the moment of opening the valve in the second half of the exhaust stroke is changed in accordance with the load. In other words, the lift amount is determined in such a manner that the lift amount is smaller in the case that the load is high, in comparison with the lift amount in the case that the load is low. Since the temperature of the burned gas is higher in the case that the load is high, in comparison with the temperature in the case that the load is low, in the state that the load is high, the self-ignition is easily generated and the noise could be a problem. However, since the lift amount is determined as mentioned above, whereby the second intake port 12 is more narrowed down in the case that the load is high in comparison with the case that the load is low, a flow speed of the burned gas which flows backward in the second intake port 12 becomes faster than the flow speed in the case that the load is low. Accordingly, since the heat transmission to the second intake port 12 is promoted, it is possible to lower the temperature of the burned gas. Thereby, since the self-ignition in the burned gas region B becomes slow, it is possible to suppress the noise.

In step S96, determined is each of the injection rates of the first fuel injection valve 21 and the second fuel injection valve 22. The injection rate is determined by utilizing the injection rate determination map shown in FIG. 7 in the same manner as the first embodiment. In step S97, the fuel injection amount of the first fuel injection valve 21 is determined by multiplying the total fuel injection amount which has been determined in step S94 by the injection rate of the first fuel injection valve 21 which has been determined in step S96. In step S98, the fuel injection amount of the second fuel injection valve 22 is determined by multiplying the total fuel injection amount which has been determined in step S94 by the injection rate of the second fuel injection valve 22 which has been determined in step S96.

Next, in step S99, each of the fuel injection valves 21 and 22 is operated in such a manner that the fuel at the fuel injection amount which has been determined in step S97 and step S98 respectively is injected fitly. In step S100, determined is an ignition timing which is suitable for the operation state of the internal combustion engine 1C, and in succeeding step S101, the ignition plug 40 is operated in such a manner that the spark is generated from the ignition plug 40 at the ignition timing. Thereafter, the step goes back to the routine in FIG. 22 which corresponds to the main routine.

According to the eighth embodiment, in the case that the air-fuel mixture region A and the burned gas region B are formed within the combustion chamber 6, the fuel is injected from each of the first fuel injection valve 21 and the second fuel injection valve 22 in accordance with the EGR rate. Accordingly, it is possible to obtain the same effect as the first embodiment. In the eighth embodiment, the ECU 17 serves as the injection amount calculating device by executing step S94 in FIG. 23, serves as the injection rate determining device of the present invention by executing step S96, and serves as the injection control device of the present invention by executing step S97 to step S99, respectively.

Ninth Embodiment

Figure 24:
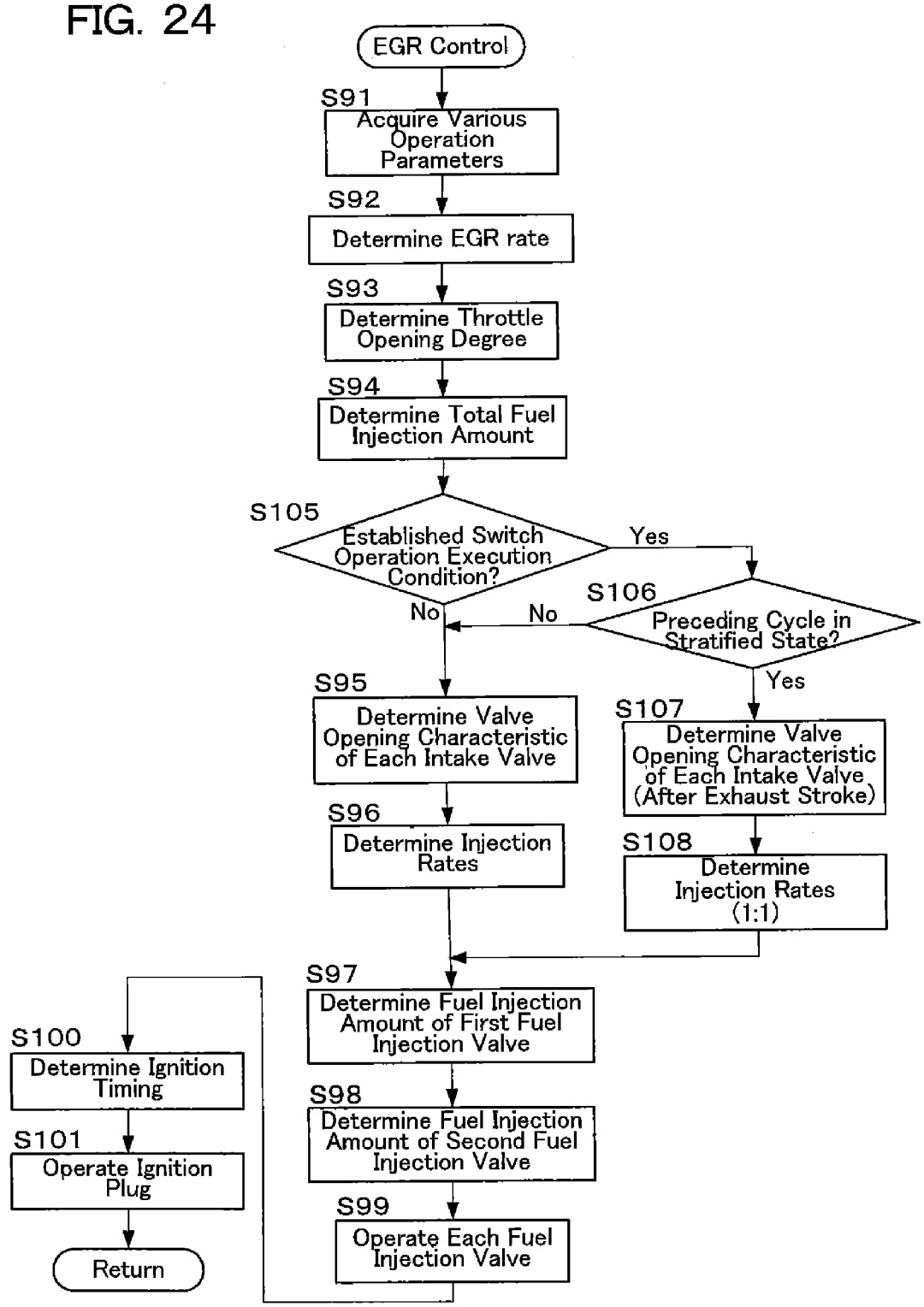
FIG. 24 is a flow chart showing an example of a control routine of an EGR control in accordance with a ninth embodiment.

Next, a description will be given about a ninth embodiment of the present invention with reference to FIG. 24. The ninth embodiment is in common with the eighth embodiment except a point that there is a difference in the control content of the EGR control. Accordingly, in the following, a description of the common portion with the eighth embodiment will be omitted. FIG. 24 is a flow chart showing an example of a control routine of an EGR control in accordance with the ninth embodiment. In FIG. 24, with regard to the same processes as those in FIG. 23, a description will be omitted by attaching the same reference numerals.

The ninth embodiment is characterized by a point of an operation while alternately switching the states per cycle between the stratified state and the unstratified state mentioned above. In other words, in step S105 in FIG. 24, it is determined whether or not a condition for carrying out the switch operation is established. The switch operation executing condition may be appropriately determined depending on the operation state. In the case that the switch operation executing condition is not established, the step goes to step S95, and the operation in the stratified state is carried out in the same manner as the eighth embodiment. On the other hand, in the case that the switch operation executing condition is established, the step goes to step S106 to determine whether or not the operation in the preceding cycle was the operation for the stratified state. In the case that the operation for the stratified state was not carried out in the preceding cycle, it can be determined that the operation in the unstratified state was carried out in the preceding cycle. Accordingly, the process is advanced to step S95 so as to carry out the operation for the stratified state in the next cycle. On the other hand, in the case that the operation for the stratified state was carried out in the preceding cycle, the process is advanced to step S107 so as to carry out the operation for the unstratified state in the next cycle.

In step S107, the valve moving mechanism 15 is controlled in such a manner that the introduction of the burned gas into the combustion chamber 6 is limited. In the present embodiment, the unstratified state is realized by controlling the valve moving mechanism 15 in such a manner that the valve opening timing of each of the intake valves 13 and 14 comes after the exhaust stroke (refer to FIG. 21). In step S108, the injection rates of the respective fuel injection valves 21 and 22 are determined to become equal to each other, and thereafter determines the fuel injection amounts of the respective fuel injection valves 21 and 22 in step S97 and step S98. Thereby, since the fuel is injected uniformly from each of the fuel injection valves 21 and 22 at the moment of the operation for the unstratified state, it is possible to enhance a uniformity of the fuel concentration of the combustion chamber 6. As mentioned above, in the present embodiment, the stratified state is different from the unstratified state in the injection rates of the respective fuel injection valves 21 and 22.

According to the ninth embodiment, it is possible to raise the combustion temperature in the combustion under the unstratified state, and the high temperature burned gas obtained thereby can be included in the burned gas region B in the stratified state in the next cycle. Accordingly, even in the case that the load is low and the temperature necessary for the self-ignition in the burned gas region B can not be obtained, it is possible to utilize in the next cycle the high temperature burned gas obtained in the unstratified state in the preceding cycle, by alternately repeating the stratified state and the unstratified state, and the self-ignition of the burned gas region B can be promoted. In the ninth embodiment, the ECU 17 serves as the injection rate determining device of the present invention by executing step S95, step S96 and step S106 to step S108 in FIG. 24.

Tenth Embodiment

Figure 25:
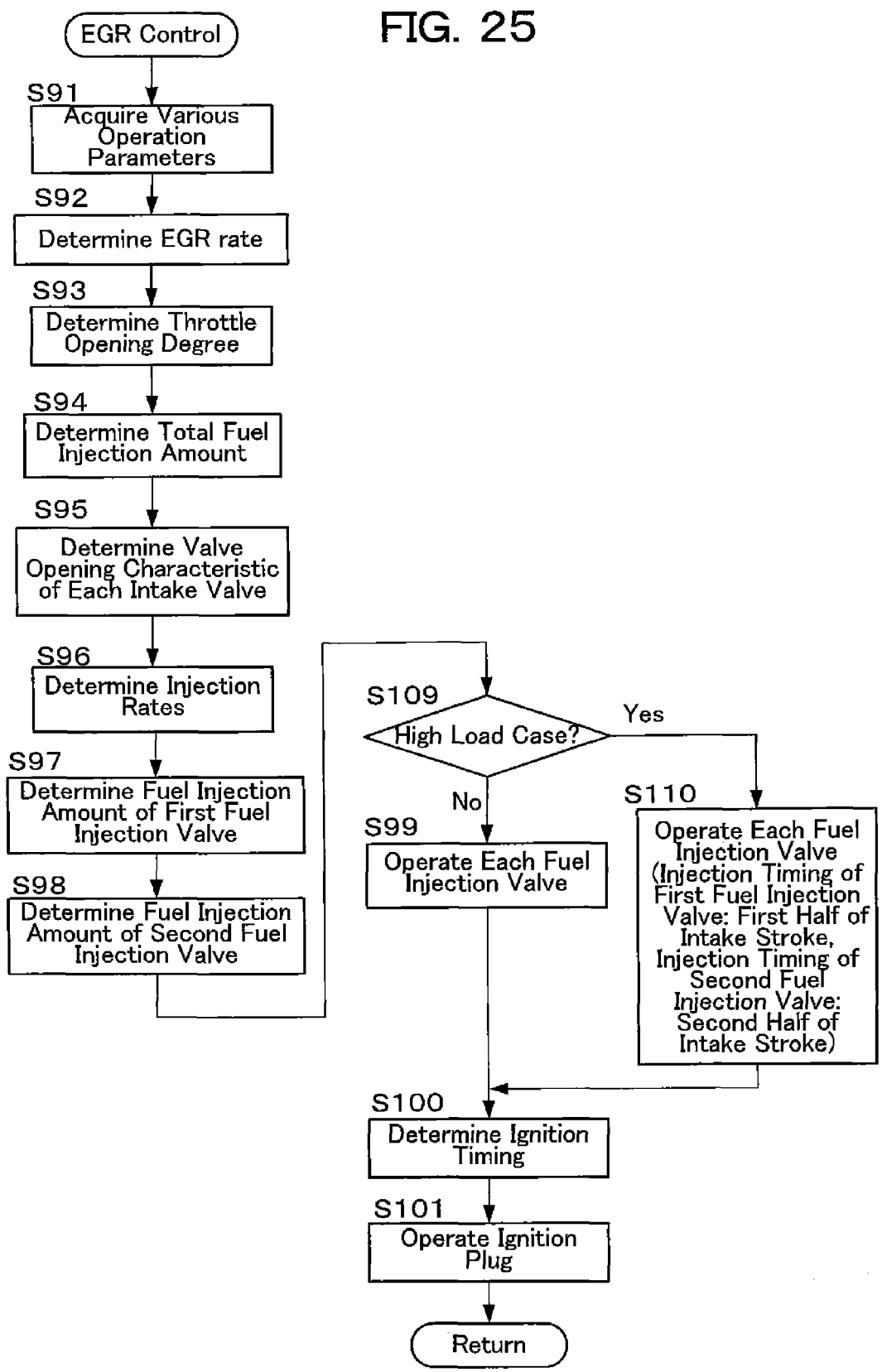
FIG. 25 is a flow chart showing an example of a control routine of an EGR control in accordance with a tenth embodiment.

Next, a description will be given about a tenth embodiment of the present invention with reference to FIG. 25. The tenth embodiment is in common with the eighth embodiment except a point that there is a difference in the control content of the EGR control. Accordingly, in the following, a description of the common portion with the eighth embodiment will be omitted. FIG. 25 is a flow chart showing an example of a control routine of an EGR control in accordance with the tenth embodiment. In FIG. 25, with regard to the same processes as those in FIG. 23, a description will be omitted and the same reference numerals are attached.

The tenth embodiment is characterized by the control of the injection timing of each of the fuel injection valves 21 and 22 in the high load case where the load is higher than a predetermined value. In other words, in step S109 in FIG. 25, it is determined whether or not the present load is the high load, the step goes to step S99 in the case that the present load is not the high load, and the step goes to step S110 in the case that the present load is the high load. In step S110, each of the fuel injection valves 21 and 22 is operated in such a manner that the fuel injection by the first fuel injection valve 21 is carried out in the first half of the intake stroke, and the fuel injection by the second fuel injection valve 22 is carried out in the second half of the intake stroke, respectively.

According to the tenth embodiment, it is possible to lower the temperature of the burned gas region B by the latent heat of vaporization of the fuel which is injected from the second fuel injection valve 22 in the second half of the intake stroke. Thereby, since it is possible to make the self-ignition slow in the high load case, it is possible to suppress the noise. In the present embodiment, the ECU 17 serves as the injection control device of the present invention by executing step S109 and step S110 in FIG. 25.

Eleventh Embodiment

Figure 26:
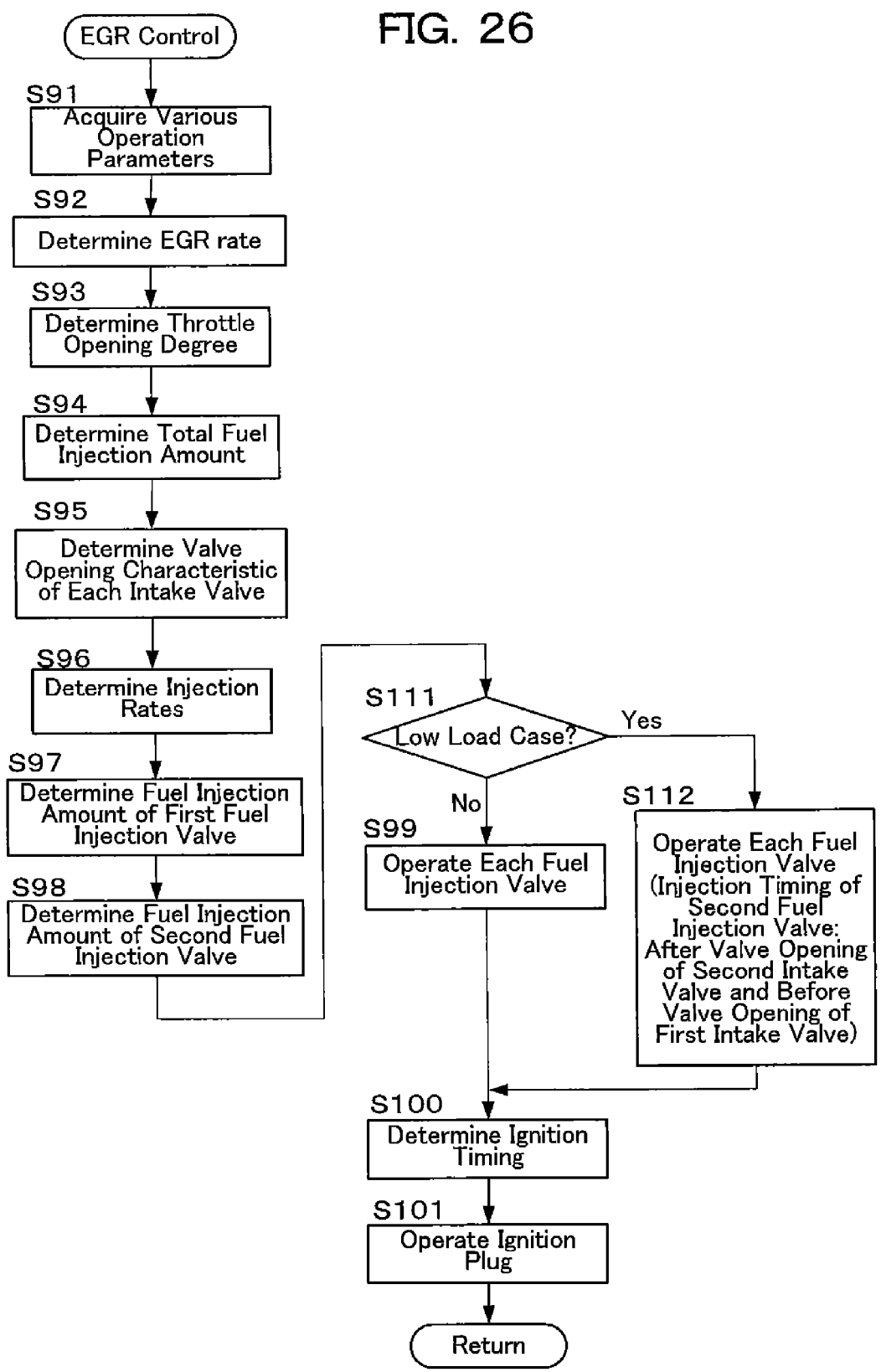
FIG. 26 is a flow chart showing an example of a control routine of an EGR control in accordance with an eleventh embodiment.

Next, a description will be given about an eleventh embodiment of the present invention with reference to FIG. 26. The eleventh embodiment is in common with the eighth embodiment except a point that there is a difference in the control content of the EGR control. Accordingly, in the following, a description of the common portion with the eighth embodiment will be omitted. FIG. 26 is a flow chart showing an example of a control routine of an EGR control in accordance with the eleventh embodiment. In FIG. 26, with regard to the same processes as those in FIG. 23, a description will be omitted and the same reference numerals are attached.

The eleventh embodiment is characterized by the control of the injection timing of each of the fuel injection valves 21 and 22 in the low load case where the load is lower than a predetermined value. In other words, in step Sill in FIG. 26, it is determined whether or not the load is the low load, the step goes to step S99 in the case of not the low load, and the step goes to step S112 in the case of the low load. In step S112, the second fuel injection valve 22 is operated in such a manner that the fuel is injected by the second fuel injection valve 22 after the valve opening of the second intake valve 14 and before the valve opening of the first intake valve 13. In this case, the injection timing of the first fuel injection valve 21 is defined in the same manner as the normal time. The period after the valve opening of the second intake valve 14 and before the valve opening of the first intake valve 13 is in such a condition that the temperature of the burned gas is comparatively high. By injecting the fuel from the second fuel injection valve 22 under such condition, the fuel is exposed to the high temperature burned gas to have an easily combustible nature. Thereby, it is possible to obtain a stable self-ignition in the burned gas region B.

The present invention is not limited to each of the embodiments mentioned above, but can be carried out in various aspects in the range of the scope of the present invention. In each of the first to seventh embodiments mentioned above, the position at which the exhaust gas is taken out of the exhaust passage 10 is optional. For example, the exhaust gas may be taken out of a downstream side of an exhaust gas purifying device such as a three-element catalyst or the like which is provided in the exhaust passage 10, and this may be introduced as external EGR gas into the second intake port 12. Further, a cooling device for cooling the external EGR gas may be optionally provided.

In each of the eighth to eleventh embodiments mentioned above, the EGR rate which should be a target is calculated in step S92 in FIG. 23 to FIG. 26, and the injection rate is determined on the basis of the EGR rate in step S96. In the case that the EGR control to be applied to the internal combustion engine 1C is changed to a control accompanying the operation state without positively controlling the EGR rate by fixing the valve opening characteristic of each of the intake valves 13 and 14, the determination of the injection rate can be carried out on the basis of the intake pressure. Since the intake pressure correlates with the EGR rate, if the injection rate of each of the fuel injection valves 21 and 22 is defined using the intake pressure as a parameter, as a result, the injection rate of each of the fuel injection valves 21 and 22 is defined depending on the EGR rate and the injection rate of the first fuel injection valve 21 is determined so as to be enhanced in accordance with the rise of the EGR rate.

In this case, the ninth embodiment mentioned above is different from the case of FIG. 21 in the limit that the amount of introduction of the burned gas into the combustion chamber 6 is reduced, in comparison with the moment of the stratified state, and the valve opening timing of each of the intake valves 13 and 14 can be simultaneously set in the second half of the exhaust stroke in such a manner that a valve overlap is formed between the intake valves and the exhaust valve 10. In this case, since the burned gas is approximately uniformly introduced into the combustion chamber 6 from each of the intake ports 11 and 12, whereby the stratification is restricted, this case is included in the category of the unstratified state. Accordingly, the present invention can be carried out by changing the ninth embodiment to an embodiment where the states are switched between such unstratified state and the stratified state.

EXPLANATION OF REFERENCES 1A, 1B, 1C internal combustion engine
6 combustion chamber 10 exhaust passage
11 first intake port
12 second intake port
13 first intake valve
14 second intake valve
15 valve moving mechanism (valve moving device, internal EGR device, stratifying device)
17 Engine control unit (ECU, injection amount calculating device, injection rate determining device, injection control device, EGR control device, characteristic acquiring device)
20 ignition plug (ignition device)
20A first ignition plug (ignition device)
20B second ignition plug (ignition device)
21 first fuel injection valve
22 second fuel injection valve
23 oxygen concentration sensor
30 EGR device (external EGR device, stratifying device)
40 ignition plug
A air-fuel mixture region
B burned gas region

The invention claimed is:

1. A spark ignition type internal combustion engine comprising:
a first intake port and a second intake port which are open to a combustion chamber;
an ignition device which feeds a spark to the combustion chamber;
a first fuel injection valve which is provided in the first intake port;
a second fuel injection valve which is provided in the second intake port;
a stratifying device which forms within the combustion chamber, an air-fuel mixture region positioned in a side of the first intake port and mainly containing air-fuel mixture, and a burned gas region positioned in a side of the second intake port and containing burned gas; and
a computer, the computer functioning, when a predetermined control program is executed, as:
an injection amount calculating device which is configured to calculate a total of fuel injection amount to be injected by each of the first fuel injection valve and the second fuel injection valve in such a manner that a combustion is realized at a target air fuel ratio;
an injection rate determining device which is configured to determine an injection rate of the fuel to be injected by each of the first fuel injection valve and the second fuel injection valve with respect to the total in order to inject the total of fuel calculated using both of the first fuel injection valve and the second fuel injection valve; and
an injection control device which is configured to control each of the first fuel injection valve and the second fuel injection valve on the basis of a result of calculation of the injection amount calculating device and a result of determination of the injection rate determining device, wherein
the injection rate determining device is configured to determine the injection rate of each of the first fuel injection valve and the second fuel injection valve depending on an EGR rate corresponding to a rate of the burned gas included in the as which is filled in the combustion chamber, so that, in a case that the air-fuel mixture region and the burned gas region are formed within the combustion chamber, the total of fuel calculated is injected using both of the first fuel injection valve and the second fuel injection valve and
the injection control device which is configured to determine fuel injection amounts to be injected by the first fuel injection valve and the second fuel injection valve respectively on the basis of the result of calculation and the result of determination, and to control the first fuel injection valve the second fuel injection valve to inject fuel whose amounts are the fuel injection amounts determined respectively.

2. The spark ignition type internal combustion engine according to claim 1, wherein
the injection rate determining device is configured to determine the injection rate of each of the first fuel injection valve and the second fuel injection valve so that the injection rate of the first fuel injection valve is enhanced in accordance with a rise of the EGR rate.

3. The spark ignition type internal combustion engine according to claim 1, wherein
an external EGR device which introduces a part of the burned gas taken out of an exhaust passage to the second intake port in a limited manner is provided as the stratifying device.

4. The spark ignition type internal combustion engine according to claim 3, comprising:
an oxygen concentration sensor which detects an air fuel ratio of the burned gas within the exhaust passage;
an EGR control device which the computer functions as when the predetermined control program is executed; and
a characteristic acquiring device which the computer functions as when the predetermined control program is executed,
the EGR control device being configured to selectively carry out an EGR execution mode where executed is the introduction of the burned gas to the second intake port by the external EGR device and an EGR prohibition mode where prohibited is the introduction, and
the characteristic acquiring device being configured to make only the first fuel injection valve inject the fuel on the basis of a result of detection of the oxygen concentration sensor in such a manner that the combustion in accordance with the target air fuel ratio is realized at a moment of carrying out the EGR prohibition mode, and to specify a correlation between the fuel injection amount and an intake air amount or an intake pressure of the first fuel injection valve at a moment when the combustion in accordance with the target air fuel ratio is realized, wherein
the injection control device is configured to change, at a moment of carrying out the EGR execution mode, the injection amount of the second fuel injection valve on the basis of the result of detection of the oxygen concentration sensor so that the combustion in accordance with the target air fuel ratio is realized, while determining the fuel injection amount of the first fuel injection valve on the basis of the correlation which is specified by the characteristic acquiring device.

5. The spark ignition type internal combustion engine according to claim 3, wherein
the injection control device is configured to control the second fuel injection valve in such a manner that the fuel injection timing by the second fuel injection valve changes depending on a load.

6. The spark ignition type internal combustion engine according to claim 5, further comprising a first intake valve which opens and closes the first intake port and a second intake valve which opens and closes the second intake port, wherein
the injection control device is configured to control the second fuel injection valve in such a manner that the fuel is injected by the second fuel injection valve in a first half of an intake stroke in which each of the first intake valve and the second intake valve opens, at a moment when the load is equal to or more than a predetermined value.

7. The spark ignition type internal combustion engine according to claim 6, further comprising a valve moving device which differentiates a gas amount to be fed to the combustion chamber via the first intake port and a gas amount to be fed to the combustion chamber via the second intake port, by operating each of the first intake valve and the second intake valve, wherein
the valve moving device operates each of the first intake valve and the second intake valve, in such a manner that the gas amount via the first intake port becomes more than the gas amount via the second intake port, in a case that the fuel is injected by the second fuel injection valve in the first half of the intake stroke.

8. The spark ignition type internal combustion engine according to claim 5, further comprising a first intake valve which opens and closes the first intake port, and a second intake valve which opens and closes the second intake port, wherein
the injection control device is configured to control the second fuel injection valve in such a manner that the fuel is injected by the second fuel injection valve before the second intake valve is opened, at a moment when the load is equal to or less than a predetermined value.

9. The spark ignition type internal combustion engine according to claim 5, further comprising a first intake valve which opens and closes the first intake port, and a second intake valve which opens and closes the second intake port, wherein
the injection control device is configured to control the first fuel injection valve and the second fuel injection valve in such a manner that the fuel is injected by each of the first fuel injection valve and the second fuel injection valve during an intake stroke in which each of the first intake valve and the second intake valve is opened, at a moment of a full load.

10. The spark ignition type internal combustion engine according to claim 5, further comprising a first intake valve which opens and closes the first intake port, and a second intake valve which opens and closes a second intake port, wherein
an ignition plug arranged in the center of the combustion chamber is provided as the ignition device, and
the injection control device is configured to control the second fuel injection valve in such a manner that the fuel is injected by the second fuel injection valve in a second half of valve opening period of the second intake valve, at a moment of an idle operation.

11. The spark ignition type internal combustion engine according to claim 3, comprising: as the ignition device, a first ignition plug which is arranged in the combustion chamber in such a manner as to be biased to a side of the first intake port and a second ignition plug which is arranged in the combustion chamber in such a manner as to be biased to a side of the second intake port; and
an ignition control device which the computer functions as when the predetermined control program is executed, the ignition control device being configured to control the first ignition plug and the second ignition plug in such a manner that the ignition by the second ignition plug is carried out earlier than the ignition by the first ignition plug, at a moment when a load is equal to or more than a predetermined value.

12. The spark ignition type internal combustion engine according to claim 3, comprising: as the ignition device, a first ignition plug which is arranged in the combustion chamber in such a manner as to be biased to a side of the first intake port and a second ignition plug which is arranged in the combustion chamber in such a manner as to be biased to a side of the second intake port; and
an ignition control device which the computer functions as when the predetermined control program is executed, the ignition control device being configured to control the first ignition plug and the second ignition plug in such a manner that the ignition by the second ignition plug is carried out later than the ignition by the first ignition plug, at a moment when a load is equal to or less than a predetermined value.

13. The spark ignition type internal combustion engine according to claim 3, comprising: as the ignition device, a first ignition plug which is arranged in the combustion chamber in such a manner as to be biased to a side of the first intake port and a second ignition plug which is arranged in the combustion chamber in such a manner as to be biased to a side of the second intake port; and
an ignition control device which the computer functions as when the predetermined control program is executed, the ignition control device being configured to control the first ignition plug and the second ignition plug in such a manner that the ignition by the second ignition plug is carried out later than the ignition by the first ignition plug, and the ignition by the second ignition plug is carried out more than once, at a moment when a rotation number is equal to or less than a predetermined value and a load is equal to or less than a predetermined value.

14. The spark ignition type internal combustion engine according to claim 1, further comprising: a first intake valve which opens and closes the first intake port, and a second intake valve which opens and closes the second intake port, wherein
as the ignition device, an ignition plug is provided, the ignition plug being arranged in the combustion chamber in such a manner as to be biased to a side of the first intake port, and
as the stratifying device, an internal EGR device is provided, the internal EGR device forming the air-fuel mixture region and the burned gas region within the combustion chamber by opening only the second intake valve in a second half of an exhaust stroke so as to lead the burned gas within the combustion chamber into the second intake port.

15. The spark ignition type internal combustion engine according to claim 14, wherein
the internal EGR device alternately switches states within the combustion chamber between a stratified state, in which the air-fuel mixture region and the burned gas region are formed within the combustion chamber by opening only the second intake valve in the second half of the exhaust stroke so as to lead the burned gas within the combustion chamber into the second intake port, and an unstratified state, in which the formation of the air-fuel mixture region and the burned gas region within the combustion chamber is limited by operating each of the first intake valve and the second intake valve, and
the injection rate determining device is configured to determine the injection rate of each of the first fuel injection valve and the second fuel injection valve in such a manner that the stratified state and the unstratified state are different from each other in the injection rate of each of the first fuel injection valve and the second fuel injection valve.

16. The spark ignition type internal combustion engine according to claim 14, wherein
the injection control device is configured to control the second fuel injection valve in such a manner that the fuel is injected by the second fuel injection valve in the second half of the intake stroke in which each of the first intake valve and the second intake valve is opened, at a moment when a load is equal to or more than a predetermined value.

17. The spark ignition type internal combustion engine according to claim 14, wherein
the injection control device is configured to control the second fuel injection valve in such a manner that the fuel is injected by the second fuel injection valve after the second intake valve is opened and before the first intake valve is opened, at a moment when a load is equal to or less than a predetermined value.

18. The spark ignition type internal combustion engine according to claim 14, wherein
the internal EGR device leads the burned gas within the combustion chamber to the second intake port by making smaller, in a case that a load is high, a lift amount of a moment of opening only the second intake valve in the second half of the exhaust stroke, in comparison with the lift amount in a case that the load is low.

* * * * *